United States Patent
Ono et al.

(10) Patent No.: US 7,332,014 B2
(45) Date of Patent: Feb. 19, 2008

(54) CERAMIC STRUCTURE, METHOD OF MANUFACTURING CERAMIC STRUCTURE, AND DEVICE FOR MANUFACTURING CERAMIC STRUCTURE

(75) Inventors: Masaharu Ono, Ibi-gun (JP); Koji Takahashi, Ibi-gun (JP); Takafumi Hoshino, Ibi-gun (JP); Hideya Kawada, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 419 days.

(21) Appl. No.: 10/986,227

(22) Filed: Nov. 12, 2004

(65) Prior Publication Data
US 2005/0178098 A1 Aug. 18, 2005

(30) Foreign Application Priority Data
Nov. 12, 2003 (JP) .............................. 2003-382820

(51) Int. Cl.
*B01D 46/00* (2006.01)
*F01N 3/022* (2006.01)
*B29C 65/70* (2006.01)

(52) U.S. Cl. ...................... 55/523; 55/282.3; 55/385.3; 55/482; 55/484; 55/DIG. 5; 55/DIG. 10; 55/DIG. 30; 95/273; 428/116; 264/250; 264/261; 264/271.1; 264/DIG. 48; 425/114; 425/123; 425/127; 156/381; 156/391

(58) Field of Classification Search ................ 55/282.2, 55/282.3, 385.3, 482, 484, 523, DIG. 5, DIG. 10, 55/DIG. 30; 95/273; 428/116, 117, 118; 264/241, 250, 251, 259, 261, 271.1, DIG. 48; 425/46, 114, 123, 126.1, 127, 129.1; 156/60, 156/349, 381, 382, 391, 500
See application file for complete search history.

(56) References Cited

U.S. PATENT DOCUMENTS

| 5,252,050 A | * | 10/1993 | Zimmer ..................... 425/114 |
| 5,914,187 A | | 6/1999 | Naruse et al. |
| 5,930,994 A | | 8/1999 | Shimato et al. |
| 6,447,564 B1 | | 9/2002 | Ohno et al. |
| 6,565,630 B2 | | 5/2003 | Ohno et al. |

(Continued)

FOREIGN PATENT DOCUMENTS

| EP | 1 291 061 A1 | 3/2003 |
| EP | 1 435 348 A1 | 7/2004 |
| EP | 1 612 197 A1 | 1/2006 |
| JP | 2000-5671 | 1/2000 |
| JP | 2000-7455 | * 1/2000 |

(Continued)

OTHER PUBLICATIONS

U.S. Appl. No. 09/926,795.

(Continued)

Primary Examiner—Jason M. Greene
(74) Attorney, Agent, or Firm—Oblon, Spivak, McClelland, Maier & Neustadt, P.C.

(57) ABSTRACT

A ceramic structure includes a plurality of porous ceramic members each being warped, each of the plurality of porous ceramic members having a bonding portion and end portions at both ends of each of the plurality of porous ceramic members in a longitudinal direction of each of the plurality of porous ceramic members, and an adhesive provided only on the bonding portion between the plurality of porous ceramic members to connect the plurality of porous ceramic members except for the end portions of the plurality of ceramic members.

33 Claims, 16 Drawing Sheets

U.S. PATENT DOCUMENTS

| | | | |
|---|---|---|---|
| 6,669,751 | B1 | 12/2003 | Ohno et al. |
| 6,770,116 | B2 | 8/2004 | Kojima |
| 2001/0022414 | A1* | 9/2001 | McCullough ............... 425/123 |
| 2003/0053940 | A1* | 3/2003 | Harada et al. .............. 428/116 |
| 2004/0031264 | A1 | 2/2004 | Kojima |
| 2004/0033175 | A1 | 2/2004 | Ohno et al. |
| 2004/0055265 | A1 | 3/2004 | Ohno et al. |
| 2004/0223892 | A1 | 11/2004 | Kojima |
| 2005/0159310 | A1 | 7/2005 | Ohno et al. |
| 2005/0176581 | A1 | 8/2005 | Ohno et al. |
| 2005/0178098 | A1 | 8/2005 | Ono et al. |
| 2005/0214504 | A1 | 9/2005 | Yoshida |
| 2005/0229565 | A1 | 10/2005 | Yoshida |
| 2005/0247038 | A1 | 11/2005 | Takahashi |
| 2005/0272602 | A1 | 12/2005 | Ninomiya |
| 2006/0019061 | A1 | 1/2006 | Oshimi |
| 2006/0029897 | A1 | 2/2006 | Saijo et al. |
| 2006/0029898 | A1 | 2/2006 | Saijo et al. |
| 2006/0043652 | A1 | 3/2006 | Saijo et al. |
| 2006/0059877 | A1 | 3/2006 | Yoshida |
| 2006/0070364 | A1* | 4/2006 | Reamsnyder et al. ......... 55/484 |
| 2006/0172113 | A1 | 8/2006 | Kunieda |
| 2006/0210765 | A1 | 9/2006 | Ohno et al. |
| 2006/0216466 | A1 | 9/2006 | Yoshida |
| 2006/0216467 | A1 | 9/2006 | Yoshida |
| 2006/0222812 | A1 | 10/2006 | Koyama et al. |
| 2006/0225390 | A1 | 10/2006 | Yoshida |
| 2006/0230732 | A1 | 10/2006 | Kunieda |

FOREIGN PATENT DOCUMENTS

| | | | |
|---|---|---|---|
| JP | 2002-60279 | | 2/2002 |
| JP | 2002-102627 | * | 4/2002 |
| JP | 2002-126421 | | 5/2002 |
| JP | 2002-126427 | | 5/2002 |
| JP | 2002-219317 | | 8/2002 |
| JP | 2002-224517 | | 8/2002 |
| JP | 2003-211430 | * | 7/2003 |
| JP | 2003-265964 | * | 9/2003 |

OTHER PUBLICATIONS

U.S. Appl. No. 10/129,126.
U.S. Appl. No. 10/477,741.
U.S. Appl. No. 10/490,206, filed Sep. 9, 2004, Komori et al.
U.S. Appl. No. 10/490,205, filed Sep. 2, 2004, Hong et al.
U.S. Appl. No. 10/493,056, filed Aug. 17, 2004, Hong et al.
U.S. Appl. No. 10/502,045, filed Jul. 29, 2004, Kudo et al.
U.S. Appl. No. 10/502,054, filed Nov. 12, 2004, Kudo et al.
U.S. Appl. No. 10/506,438, filed Sep. 2, 2004, Taoka et al.
U.S. Appl. No. 10/502,044, filed Jul. 29, 2004, Taoka et al.
U.S. Appl. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 18, 2004, Kunieda et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 11/033,151, filed Jan. 12, 2005, Ohno et al.
U.S. Appl. No. 10/521,592, filed Jan. 18, 2005, Ohno et al.
U.S. Appl. No. 11/225,197.
U.S. Appl. No. 10/518,548, filed Jan. 3, 2005, Takahashi.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.
U.S. Appl. No. 11/476,929.
U.S. Appl. No. 11/496,431.
U.S. Appl. No. 11/513,149.
U.S. Appl. No. 11/518,998.
U.S. Appl. No. 11/600,775.
U.S. Appl. No. 11/600,784.

* cited by examiner

Cross-section on A-A line

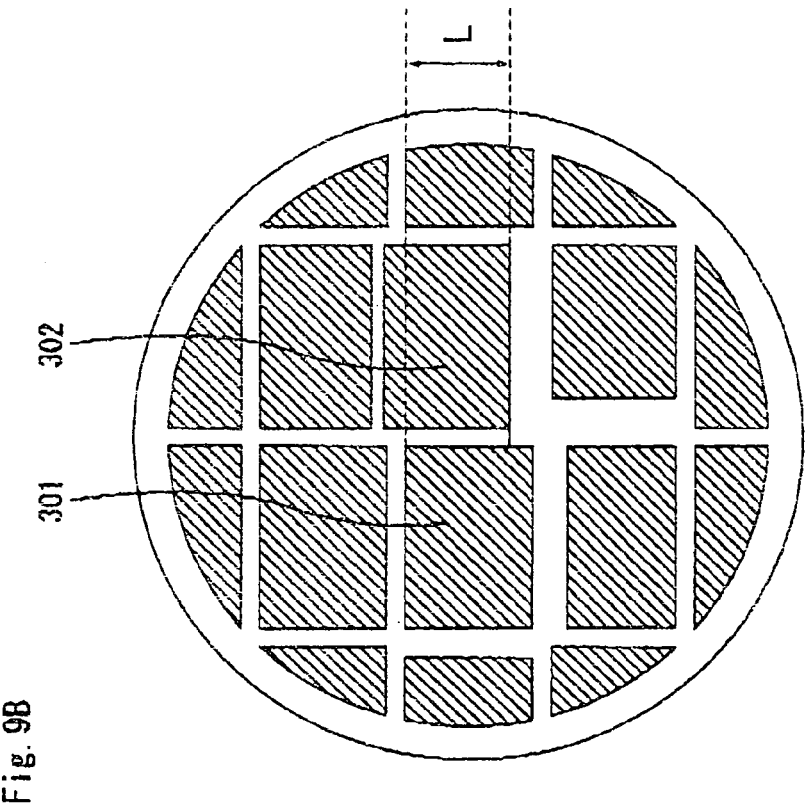
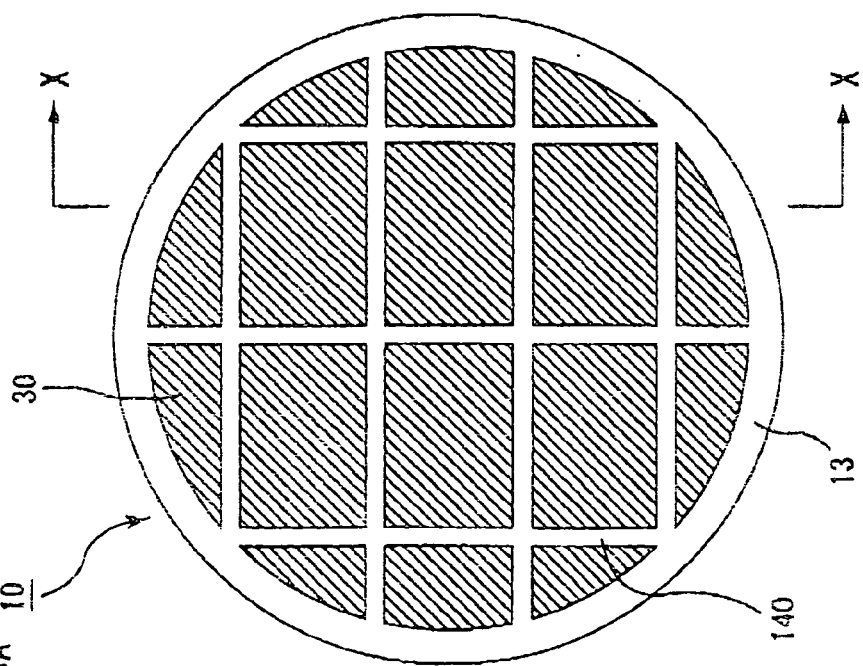

CERAMIC STRUCTURE, METHOD OF MANUFACTURING CERAMIC STRUCTURE, AND DEVICE FOR MANUFACTURING CERAMIC STRUCTURE

CROSS-REFERENCE TO RELATED APPLICATIONS

The present application claims priority to Japanese Patent Application No. 2003-382820, filed Nov. 12, 2003. The contents of that application are incorporated herein by reference in their entirety.

BACKGROUND OF THE INVENTION

1. Field of the Invention

The present invention relates to a ceramic structure, a method of manufacturing the ceramic structure, and a device for manufacturing the ceramic structure.

2. Discussion of the Background

Particulates contained in an exhaust gas from an internal combustion engine of a vehicle, such as a bus or track, or a construction machine or the like are harmful to the environment and human bodies. Thus, a ceramic structure serving as a ceramic filter is used to trap the particulates and clean up the exhaust gas.

Japanese Patent Laid-Open Publication Nos. 2002-102627, 2002-224517 and 2002-219317 disclose a method of producing a ceramic filter as follows. First, porous ceramic members are fabricated. Next, with the porous ceramic members placed in an inclined state on a table having a V-shaped cross section, an adhesive paste which is a material for an adhesive paste layer is applied to two side surfaces facing upward. Then, a gap holding member comprised of thick paper or the like is placed to form an adhesive paste layer. Further, other porous ceramic members are stacked on the adhesive paste layer in order. A ceramic member assembly having porous ceramic members laminated via the adhesive paste layer is constructed in this manner. Then, the adhesive paste layer is dried to be the adhesive, after which the ceramic member assembly is cut out into a predetermined shape, such as a columnar shape, providing a ceramic block. Finally, an outer sealer is formed on the outer surface of the ceramic block, yielding the ceramic structure.

Japanese Patent Laid-Open Publication Nos. 2002-126421 and 2002-126427 disclose a manufacturing method including the steps of adhering a masking material to the end faces of the ceramic structure before application of the adhesive paste and separating the masking material after application of the adhesive paste.

The contents of Japanese Patent Laid-Open Publication No. 2002-102627, Japanese Patent Laid-Open Publication No. 2002-224517, Japanese Patent Laid-Open Publication No. 2002-219317, Japanese Patent Laid-Open Publication No. 2002-126421 and Japanese Patent Laid-Open Publication No. 2002-126427 are incorporated herein by reference in their entirety.

SUMMARY OF THE INVENTION

According to one aspect of the present invention, a ceramic structure includes a plurality of porous ceramic members each being warped, each of the plurality of porous ceramic members having a bonding portion and end portions at both ends of each of the plurality of porous ceramic members in a longitudinal direction of each of the plurality of porous ceramic members, and an adhesive provided only on the bonding portion between the plurality of porous ceramic members to connect the plurality of porous ceramic members except for the end portions of the plurality of ceramic members.

According to another aspect of the present invention, a ceramic structure is produced by a process including providing a plurality of porous ceramic members to have a space between the plurality of porous ceramic members, supplying a bonding material to the space, and hardening the bonding material to bond the plurality of porous ceramic members to each other.

According to yet another aspect of the present invention, a device for manufacturing a ceramic structure includes an assembly unit configured to accommodate a plurality of porous ceramic members positioned to have a space between the plurality of porous ceramic members, and a supply unit connected to the assembly unit and configured to supply a bonding material to the space so as to bond the plurality of porous ceramic members to each other.

According to yet another aspect of the present invention, a method of manufacturing a ceramic structure includes providing a plurality of porous ceramic members to have a space between the plurality of porous ceramic members, supplying a bonding material to the space, and hardening the bonding material to bond the plurality of porous ceramic members to each other.

According to yet another aspect of the present invention, a method of manufacturing a ceramic structure includes providing a manufacturing device including a assembly unit configured to accommodate a plurality of porous ceramic members, and a supply unit connected to the assembly unit and configured to supply a bonding material, assembling the plurality of porous ceramic members such that a space is provided between the plurality of porous ceramic members, supplying a bonding material from the supply unit to the space, and hardening the bonding material to bond the plurality of porous ceramic members to each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9A is a diagram showing the ceramic structure according to one embodiment of the invention;

FIG. 9B is a diagram showing an example of a ceramic structure having misaligned porous ceramic members;

DESCRIPTION OF THE EMBODIMENTS

Figure 1:
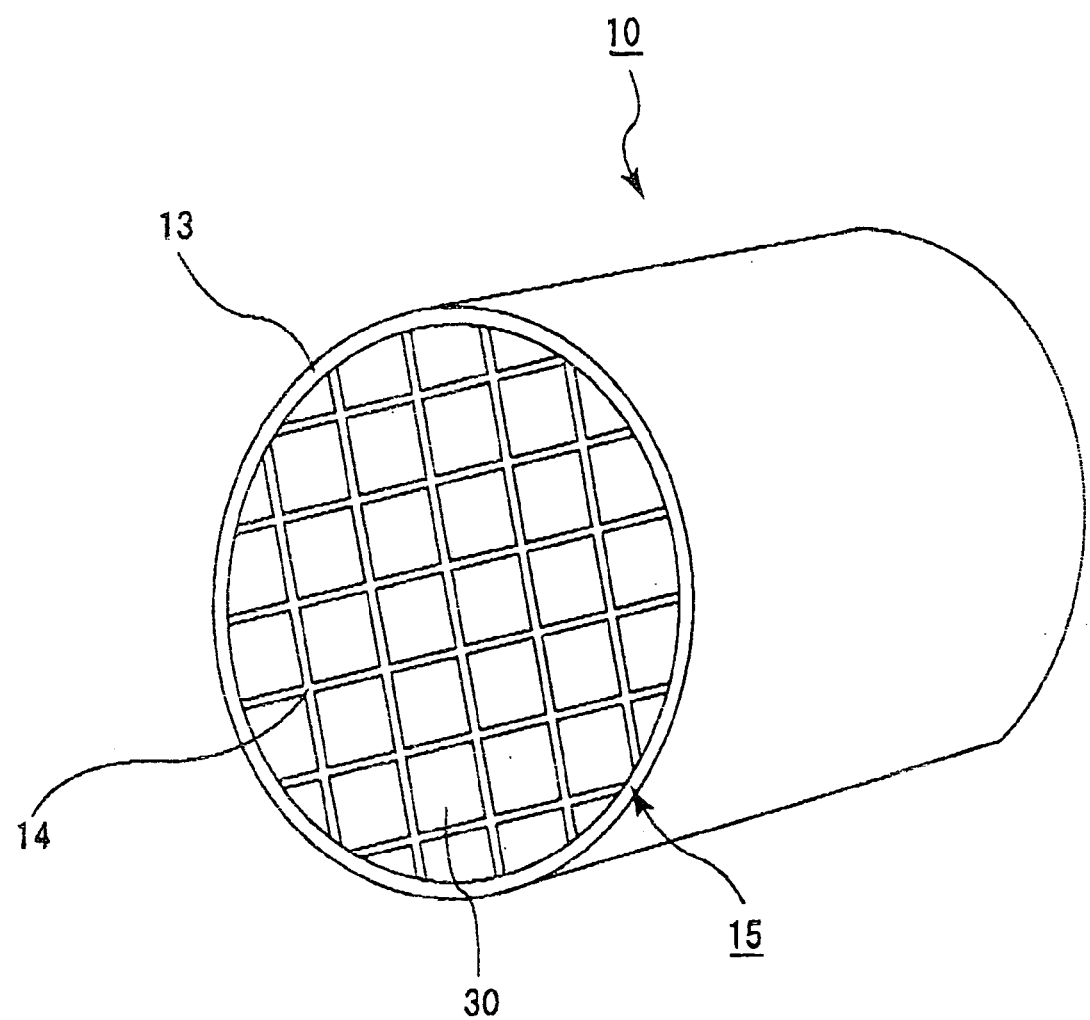
FIG. 1 is a perspective view showing a ceramic structure according to one embodiment of the present invention.

The embodiments will now be described with reference to the accompanying drawings, wherein like reference numerals designate corresponding or identical elements throughout the various drawings.

Figure 2A:
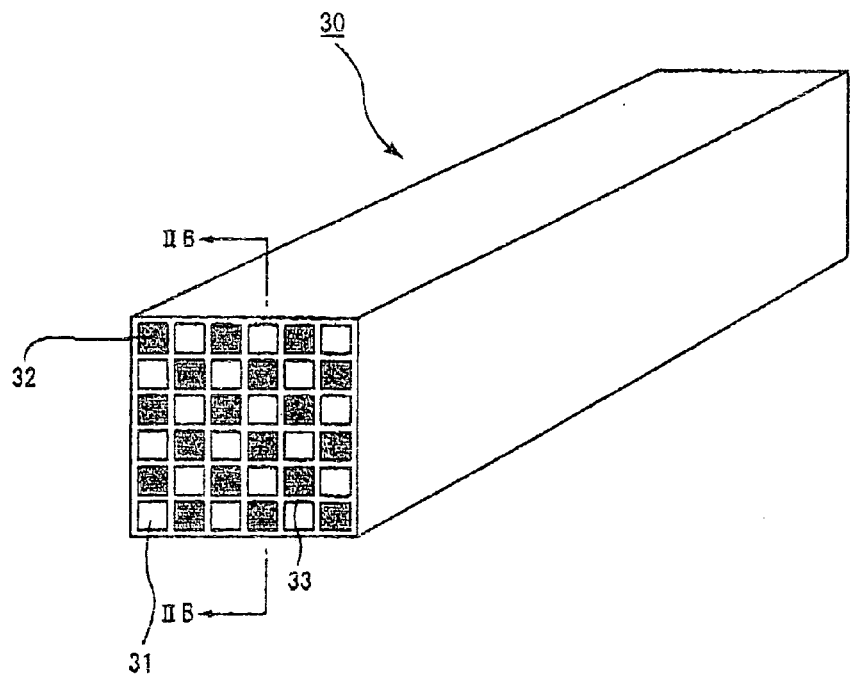
FIG. 2A is a perspective view showing the ceramic member which serves as a filter.
Figure 2B:
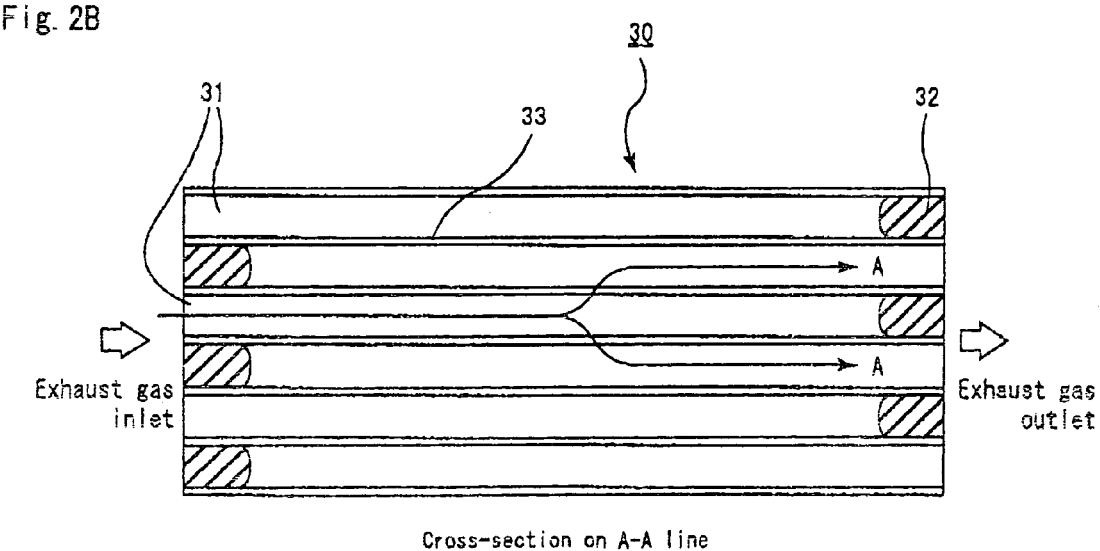
FIG. 2B is a cross-sectional view of the porous ceramic member on the line IIB-IIB of FIG. 2A.

FIG. 1 is a perspective view showing a ceramic structure according to one embodiment of the present invention, FIG. 2A is a perspective view showing a porous ceramic member which serves as a filter, and FIG. 2B is a cross-sectional view of the porous ceramic member on the line IIB-IIB of FIG. 2A.

A honeycomb filter, like a ceramic structure 10 as shown in FIG. 1, has a plurality of porous ceramic members 30 of silicon carbide or the like connected via adhesives 14, forming a ceramic block 15, and an outer sealer 13 formed on the outer surface thereof. As shown in FIGS. 2A and 2B, the porous ceramic member 30 has multiple through holes 31 that extend in the longitudinal direction of the porous ceramic member 30, and partitions 33 which set the through holes 31 apart from one another. The partitions 33 are configured to filter out particulates in a gas entered from the through holes 31. The through holes 31 formed in the porous ceramic member 30 are sealed by sealing materials 32 alternately at the end portion on the inlet side of the exhaust gas or at the end portion on the outlet side thereof as shown in FIG. 2B, and the exhaust gas which has entered one through hole 31 passes through the partitions 33 separating this through hole 31 from the adjoining through holes 31 and flows out through the adjoining through holes 31 as indicated by an arrow A in FIG. 2B.

When the ceramic structure 10 with such a structure is disposed in the exhaust passage of an internal combustion engine in an exhaust gas clean-up apparatus, particulates in the exhaust gas exhausted from the internal combustion engine are trapped by the partitions 33 as they pass through the ceramic structure 10, and thus the exhaust gas is cleaned up.

Figure 3:
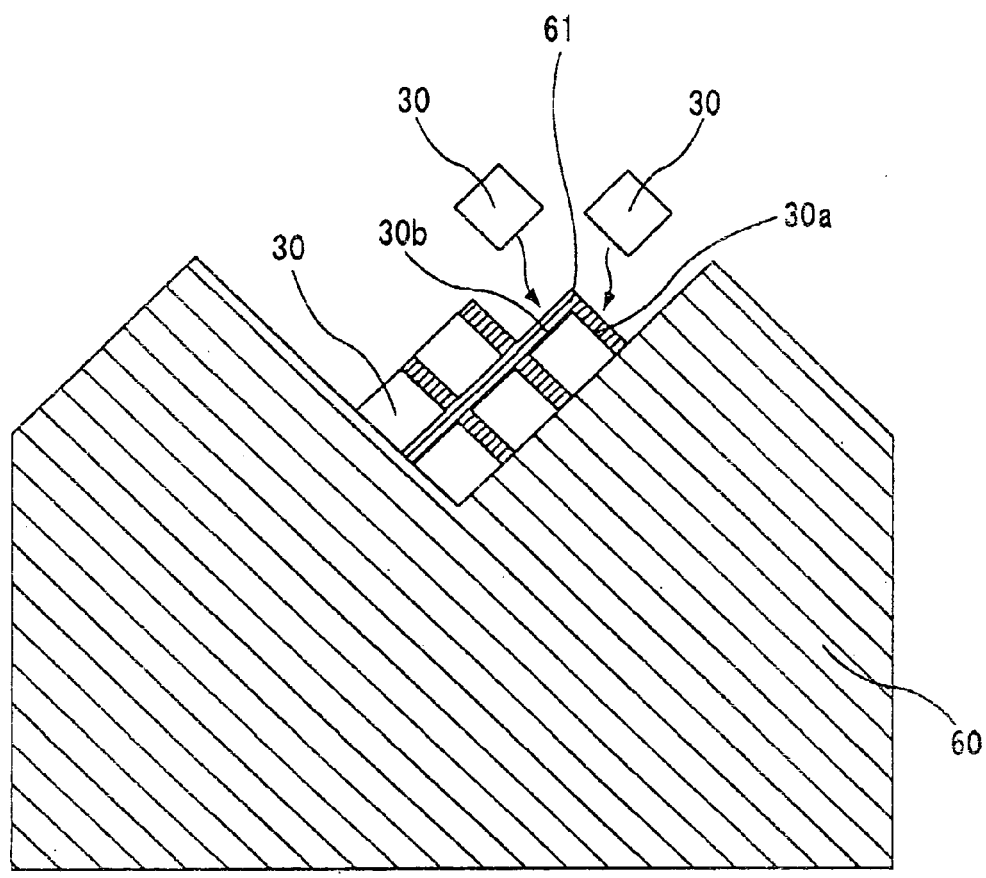
FIG. 3 is an explanatory diagram illustrating a method of manufacturing a ceramic block.

For example, a ceramic structure 10 as shown in FIG. 1 can be manufactured as follows. First, porous ceramic members 30 are fabricated. Next, as shown in FIG. 3, with the porous ceramic members 30 placed in an inclined state on a table 60 having a V-shaped cross section, an adhesive paste which is a material for an adhesive paste layer 61 is applied to two side surfaces 30a and 30b facing upward. Then, a gap holding member comprised of thick paper or the like is placed to form an adhesive paste layer 61. Further, other porous ceramic members 30 are stacked on the adhesive paste layer 61 in order. A ceramic member assembly having porous ceramic members 30 laminated via the adhesive paste layer 61 is constructed in this manner. Then, the adhesive paste layer 61 is dried to be the adhesive 14, after which the ceramic member assembly is cut out into a predetermined shape, such as a columnar shape, providing a ceramic block 15. Finally, an outer sealer 13 is formed on the outer surface of the ceramic block 15, yielding the ceramic structure 10.

When the ceramic structure 10 is manufactured by this method, however, the adhesive paste applied to the side surfaces of the porous ceramic member 30 may leak out to the end face portions of the porous ceramic member 30 at the step of constructing the ceramic member assembly. The leaked paste adheres to the portions where through holes 31 are formed, blocking the through holes 31. When the adhesive paste blocks the through holes 31, the through holes 31 may be clogged, which may degrade the filter function of the ceramic structure 10.

Figure 4A:
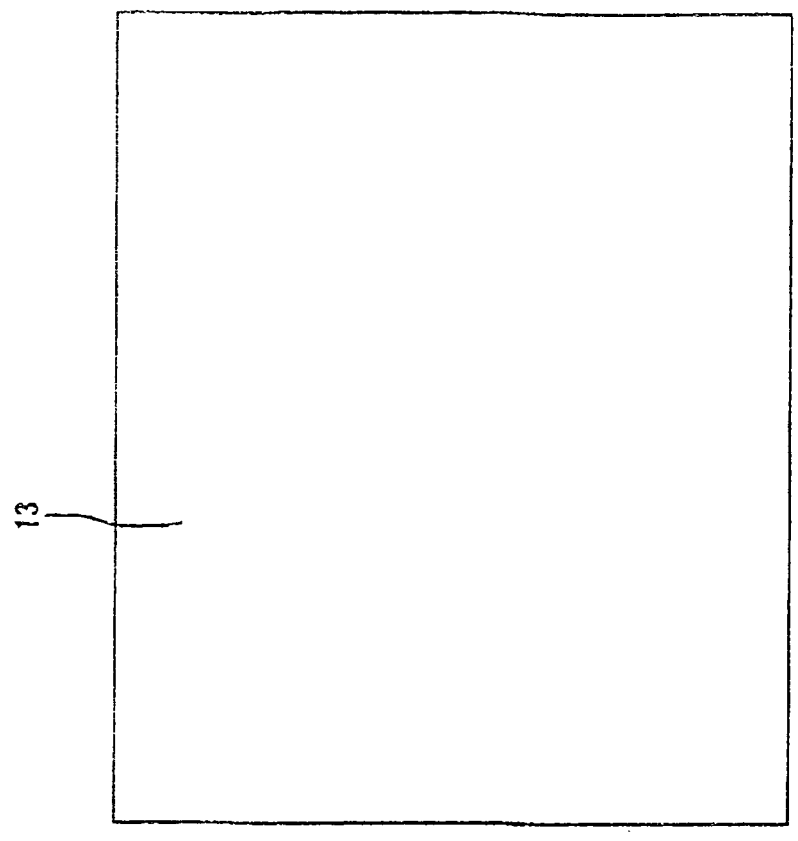
FIG. 4A is a front view of a ceramic structure according to one embodiment of the present invention.
Figure 4B:
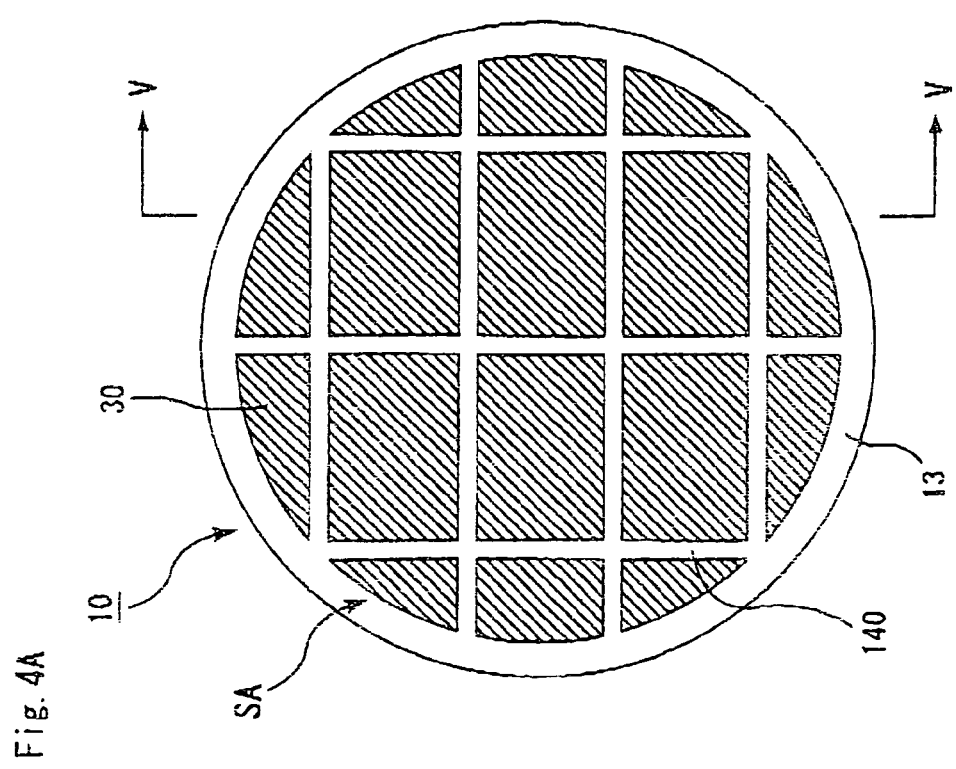
FIG. 4B is a side view of the ceramic structure.

Referring to FIGS. 4A to 6B, a ceramic body 10 according to one embodiment of the present invention will be described in more detail. FIG. 4A is a front view of the ceramic structure 10, and FIG. 4B is a side view of the ceramic structure 10. The ceramic structure 10 has porous ceramic members 30 that are warped and connected together via adhesives 140. An outer sealer 13 is formed on an outer surface SA. The outer sealer 13 has a sealing capability to inhibit the leakage of the exhaust gas when the ceramic structure is adapted to an exhaust gas filter. FIGS. 4A and 4B illustrate the ceramic structure 10 having a columnar shape, but the shape of the ceramic structure 10 is not particularly limited.

Figure 5:
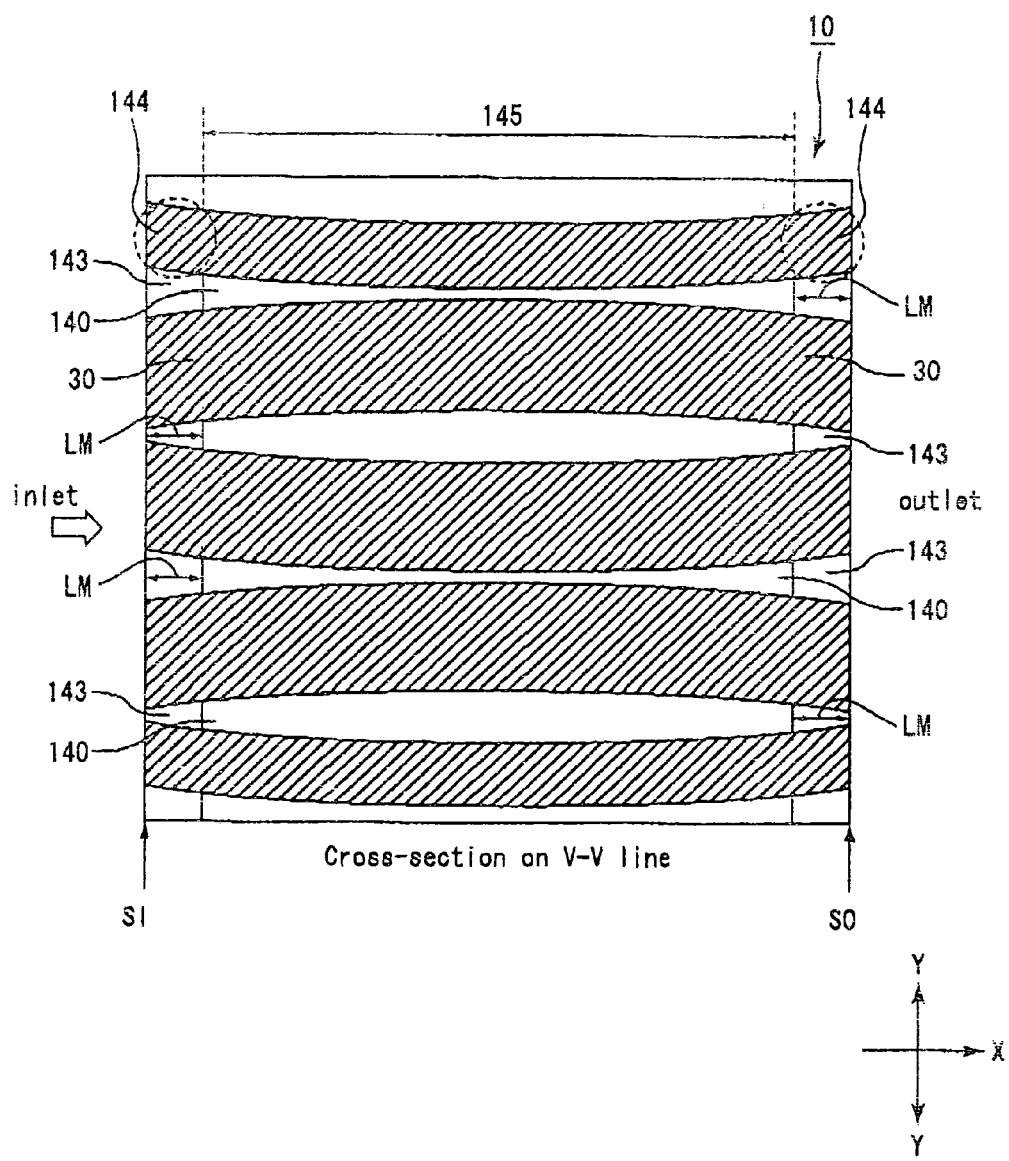
FIG. 5 is a cross-sectional view of the ceramic structure in FIG. 4A on the line V-V.

FIG. 5 shows the cross section of the ceramic structure 10 on line V-V of FIG. 4A. The porous ceramic members 30 are each warped in a direction substantially perpendicular to the longitudinal direction (the direction along the x-axis shown in FIG. 5) of each of the porous ceramic members 30. As shown in FIG. 5, the porous ceramic members 30 have top surfaces ST and bottom surfaces SB having a curvature in the vertical direction (the direction along the y-axis), and the porous ceramic members 30 positioned adjacent to each other in the vertical direction are bent toward or away from each other.

Figure 8A:
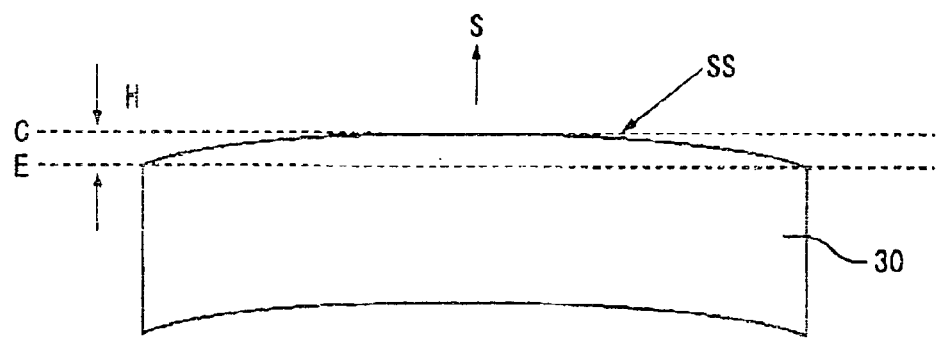
FIG. 8A is an exemplary diagram showing a method of measuring warping of the porous ceramic member.
Figure 8B:
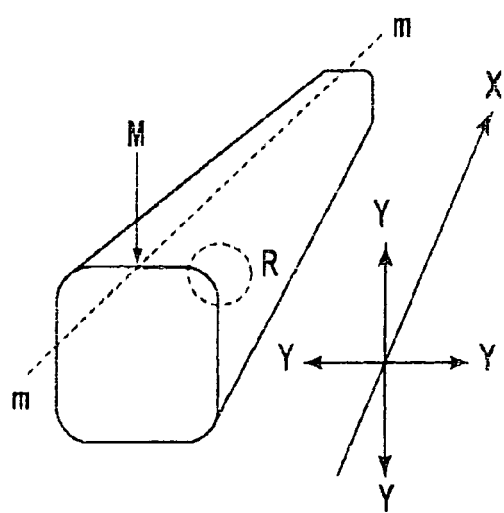
FIG. 8B is an exemplary diagram showing another method of measuring the warping of the porous ceramic member and showing the x-axis and y-axis.

Here, the direction of the curvature of the porous ceramic members 30 is not limited to the vertical direction as shown in FIG. 5, but the curvature direction also includes the directions along the y-axes shown in FIG. 8B, as long as the porous ceramic members 30 are each warped in a direction substantially perpendicular to the longitudinal direction (the direction along the x-axis in FIG. 8B).

Since the porous ceramic members 30 are warped as such, the porous ceramic members 30 less easily come out of the ceramic structure 10. The adhesives 140 are not entirely filled in the space between the porous ceramic members 30, and adhesive unfilled portions (hereinafter, referred to as "unfilled portions") 143 are present at end faces SI and SO of the ceramic structure 10. The adhesives 140 are provided only on a bonding portion 145 of each porous ceramic member 30, and the adhesives 140 connect the porous ceramic members 30 except for end portions 144 at both ends of the porous ceramic members 30 in the longitudinal direction. Thus, the end portions 144 of the porous ceramic members 30 at one end (either the end face SI side or SO side) of the ceramic structure 10 are separated from each other by the unfilled portions 143. The end portions 144 of the porous ceramic members 30 are portions unconnected to other porous ceramic members 30 and correspond to the unfilled portions 143 where the adhesives 140 are not filled in.

Figure 6A:
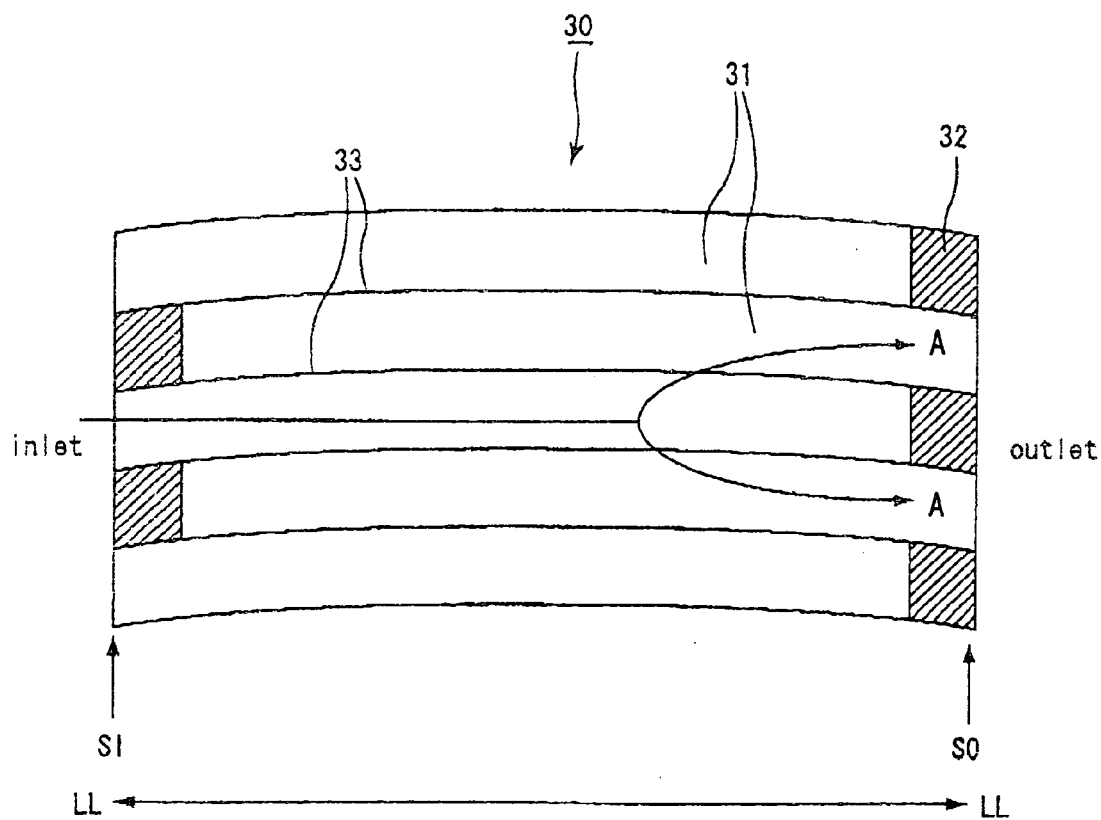
FIG. 6A is a cross-sectional view of a porous ceramic member of the ceramic structure.
Figure 6B:
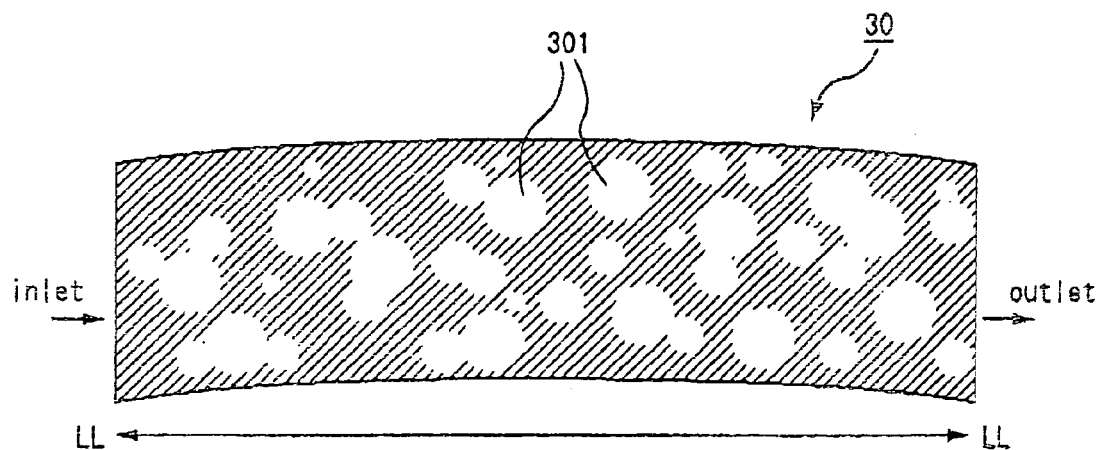
FIG. 6B is a cross-sectional view of a porous ceramic member in the form of a ceramic foam.

While omitted in FIG. 5, the detailed illustration of the cross section of each porous ceramic member 30 is given in FIGS. 6A and 6B. FIG. 6A shows multiple through holes 31 that extend in the longitudinal direction with partitions 33 positioned between the through holes 31. In FIG. 6A, at the inlet-side and the outlet-side end faces SI and SO, the through holes 31 are alternately sealed by sealing materials 32 at one of end portions of each through hole 31. When the ceramic structure 10 is employed as an exhaust gas filter, gas permeable partitions 33 are used, and the gas from the inlet side flows as indicated by the arrow A and passes through the partitions 33. The particulates in the exhaust gas are trapped by the partitions 33. The porous ceramic member 30 as described above may have a honeycomb structure, which can increase the trapping area for particulates and is thus more advantageous in shape as an exhaust gas filter.

When the ceramic structure 10 is used as an exhaust gas clean-up ceramic filter, the adhesives 140 serve as sealers to inhibit the leakage of the exhaust gas.

FIG. 6B is a cross-sectional view of the porous ceramic member 30 when the porous ceramic member 30 is a ceramic foam. When the porous ceramic member 30, which has multiple large and small voids 301 inside the ceramics, is used as exhaust gas clean-up ceramic filter, particulates in the exhaust gas are trapped on the inner walls of the voids 301 when the exhaust gas passes through the voids 301.

The following will discuss why the ceramic structure 10 shown in the cross-sectional view in FIG. 5 has improved rigidity against external force applied thereto.

Figure 7:
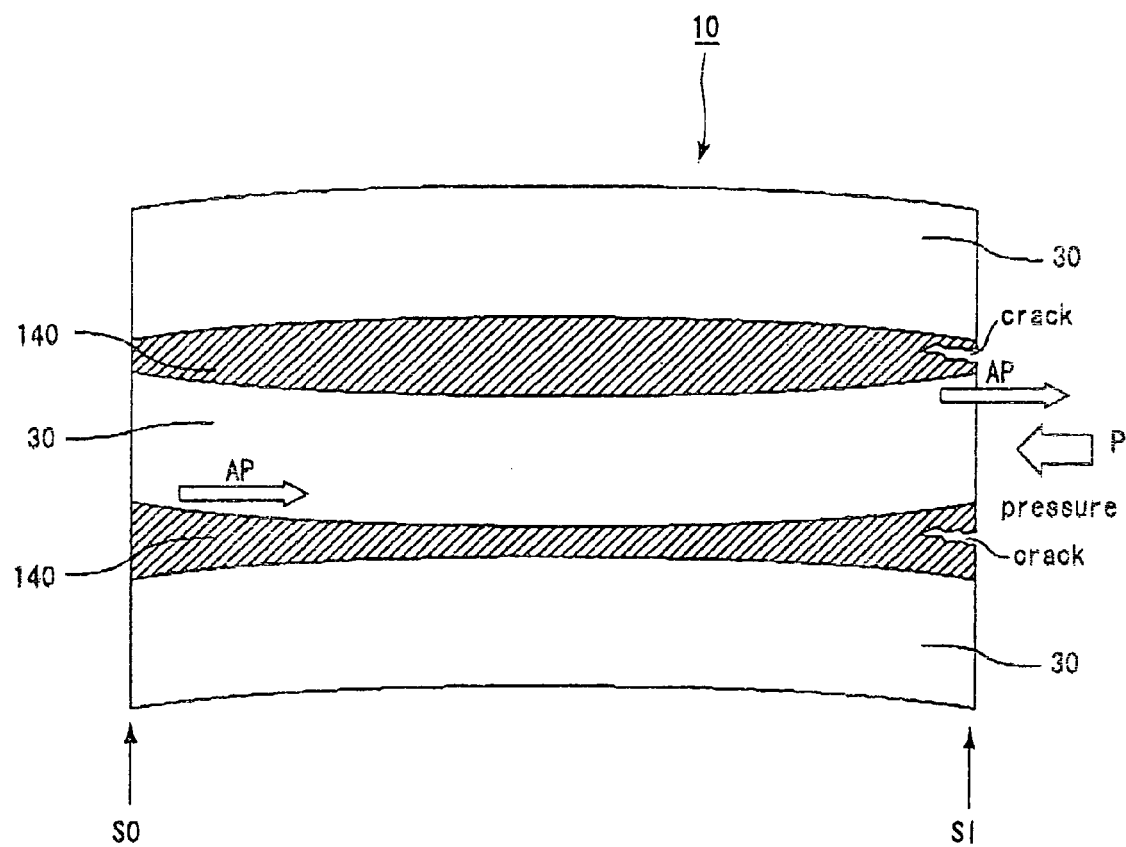
FIG. 7 is an exemplary diagram showing a crack production in a porous ceramic member without an adhesive-layer unfilled portion.

FIG. 7 shows the cross section of a porous ceramic member where no adhesive unfilled portions are present at the end faces SI and SO. As shown in FIG. 7, when the pressure P is applied to the end face SI in the direction perpendicular to the end face SI of the ceramic structure 10 comprised of porous ceramic members 30 that are warped as shown in FIG. 7, resistive force AP against the pressure acts on the interface between the porous ceramic members 30. Accordingly, the strength of the ceramic structure 10 against the pressure P is supposed to be enhanced. With the ceramic structure 10 using the warped porous ceramic members 30, however, the adhesive 140 has a minimum or maximum thickness near the end face SI of the ceramic structure 10. When the adhesive 140 is thinner, the adhesion strength between the porous ceramic members 30 is lower. When the adhesive 140 is thicker, the area of the adhesive 140 which receives the pressure becomes larger (even with the same pressure, as the area increases, the receiving force becomes greater). Hence, in those situations, an initial crack may be produced at the end face SI. It is thought that as the crack progresses, the strength of the ceramic structure 10 against the pressure decreases abruptly.

In the ceramic structure 10 shown in the cross-sectional view in FIG. 5, the elimination of the adhesive 140 near the end face SI of the ceramic structure 10 to form the unfilled portions 143 more effectively prevents an initial crack from being produced when the perpendicular pressure is applied to that end face SI, thereby improving the rigidity of the ceramic structure 10 against such a pressure.

FIG. 8A illustrates the warping of the porous ceramic member 30. It is desirable that the amount of warping of the porous ceramic member 30 ranges from about 0.02 mm to about 2.0 mm. Within this range, the strength against the pressure is improved, which is particularly advantageous when the ceramic structure 10 is used as an exhaust gas clean-up ceramic filter. Also, the porous ceramic member 30 having the amount of warping of from about 0.1 mm to about 0.8 mm is preferred, because the thermal conductivity between the porous ceramic members 30 becomes higher in this range. When the ceramic structure 10 having such porous ceramic members 30 is used as an exhaust gas clean-up filter, heat accumulation in the central portion of the ceramic structure 10 is more effectively avoided. When a ceramic structure is used as an exhaust gas clean-up filter, heat accumulation in the center portion of the ceramic structure is problematic, since cracking in the porous ceramic members of the ceramic structure may be caused by the difference in thermal expansion between the center and peripheral portions of the ceramic structure. However, when the porous ceramic members 30 have the amount of warping of from about 0.1 mm to about 0.8 mm, because of the improved thermal conductivity, cracking in the porous ceramic members 30 is more effectively prevented. Furthermore, the amount of warping in the porous ceramic member 30 is preferably from about 0.006% to about 1.0% of the longitudinal length (length of the horizontal LL-LL line shown in FIG. 6A) of the ceramic structure 10. Such a range is preferred because the ceramic structure 10 employed as an exhaust gas clean-up filter becomes stronger against the gas pressure.

Here, the amount of warping of the porous ceramic member 30 is the amount by which a curved surface of the porous ceramic member 30 deviates from being flat, and is represented by a difference H in FIG. 8A. In FIG. 8A, the porous ceramic member 30 is placed such that the direction of the greatest warping on a side surface SS faces upward (in the direction of an arrow S). The difference H is measured by the difference between the height C of the highest position (not necessarily the center) of a side surface SS which has the largest warping and the height E of both ends of the side surface SS of the porous ceramic member 30.

For example, in the case of a ceramic member of a square pole, the heights C and E as described above are obtained, for each of the four side surfaces, by measuring the height of an imaginary plane which passes both ends (like the height E) and the height of an imaginary plane which passes the position of the greatest warping (like the height C), as given in the description of the measurement of the flatness in JIS B0621-1984, the contents of which are incorporated herein by reference in their entirety.

As the cross section of the ceramic member may not be uniform due to chamfering R or the like done at the corners as shown in FIG. 8B, the amount of warping may be measured along a line m-m passing the center portion, M, of the side that forms the outer surface of the cross section.

In the ceramic structure 10 shown in the cross-sectional view in FIG. 5, the length, LM, of the unfilled portion 143 (the length from the end face of the porous ceramic member 30 to the adhesive 140) is preferably about 1% to about 10% of the longitudinal length of the ceramic structure 10 so that the ceramic structure 10 has an excellent adhesion strength as mentioned above. When the amount of warping is about 0.02 mm to about 2.0 mm, the length LM of the unfilled portion 143 is desirably about 1% to about 10% of the longitudinal length of the ceramic structure 10.

When the ceramic structure 10 is used as an exhaust gas clean-up ceramic filter, the length LM of the unfilled portion 143 is preferably about 2% to about 5% of the longitudinal length of the ceramic structure 10. This is because in this range, higher breaking strength is achieved even when the ceramic structure 10 is exposed to intense vibration when discharging the exhaust gas or the heat cooling cycle with the exhaust gas of approximately 800° C. to 900° C.

FIG. 9A shows a ceramic structure 10 according to this embodiment of the present invention. For the comparative purpose, FIG. 9B shows an example of a less desired ceramic structure that may be produced by the method shown in FIG. 3.

When the ceramic structure 10 in FIG. 9A is manufactured by supplying a paste to the spaces between the porous ceramic members 30 after the porous ceramic members 30 are put together, the porous ceramic members 30 are connected together via the adhesives 14 having a uniform thickness and are not misaligned from one another. In the ceramic structure shown in FIG. 9B, in contrast, misalignment of the porous ceramic members and fluctuation in the thicknesses of the adhesives are caused.

As the porous ceramic members 30 according to the present embodiment have no undesirable misalignment, sufficient connecting areas between the porous ceramic members 30 are secured, thereby improving the connecting strength and rigidity against the external force. On the other hand, in the example shown in FIG. 9B, since porous ceramic members 301 and 302 are misaligned from each other, the area connecting the porous ceramic members 301 and 302 is reduced as indicated by "L", and thus the ceramic structure becomes more vulnerable to external pressures.

Figure 10:
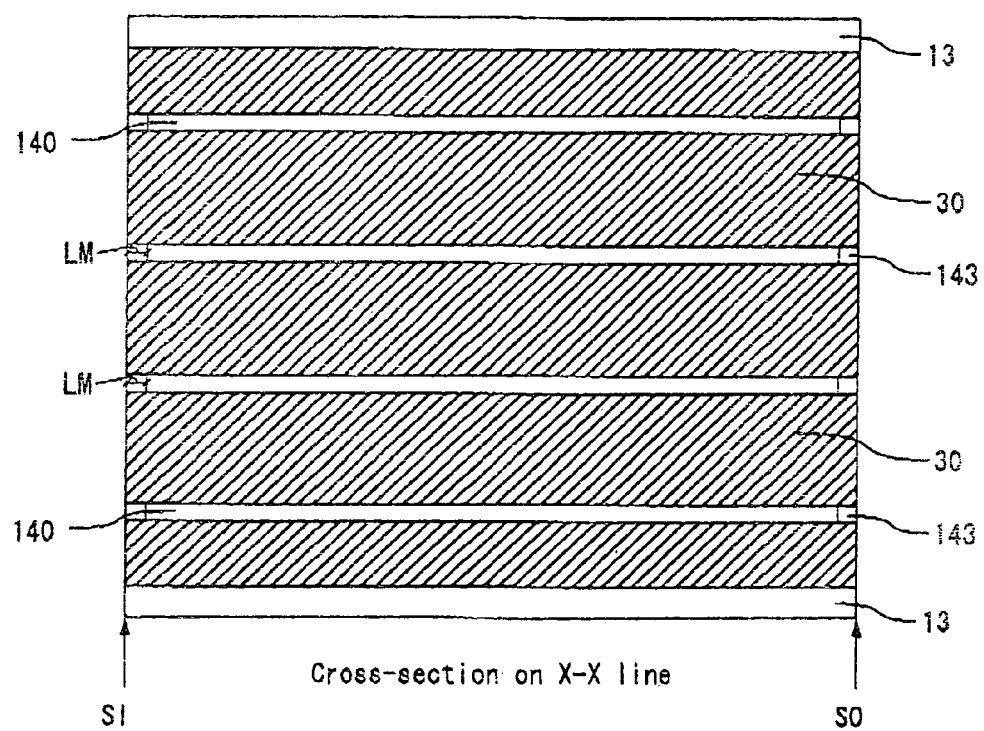
FIG. 10 is a cross-sectional view of the ceramic structure shown in FIG. 9A on the line X-X.

FIG. 10 shows the cross section of the ceramic structure 10 shown in FIG. 9A on the line X-X. The porous ceramic members 30 are connected together via the adhesives 140 having a uniform thickness. Further, the unfilled portions 143 are provided at the end faces SI and SO, so that the end faces are not blocked by the adhesive 140.

The porous ceramic member 30 may have a honeycomb structure as shown in FIG. 6A or ceramic foam as shown in FIG. 6B. The porous ceramic member 30 which has warping may be used in place of a warp-free porous ceramic member shown in FIG. 10. It is desirable that the amount of warping ranges from about 0.02 mm to about 2.0 mm as mentioned earlier. It is advantageous that the length LM of the unfilled portion 143 (the length from the end face of the porous ceramic member 30 to the adhesive 140) ranges from about 1% to about 10% of the longitudinal length of the ceramic structure 10.

When the ceramic structure is used as an exhaust gas clean-up ceramic filter, the adhesives 140 serve as sealers to prevent the leakage of the exhaust gas.

Figure 11:
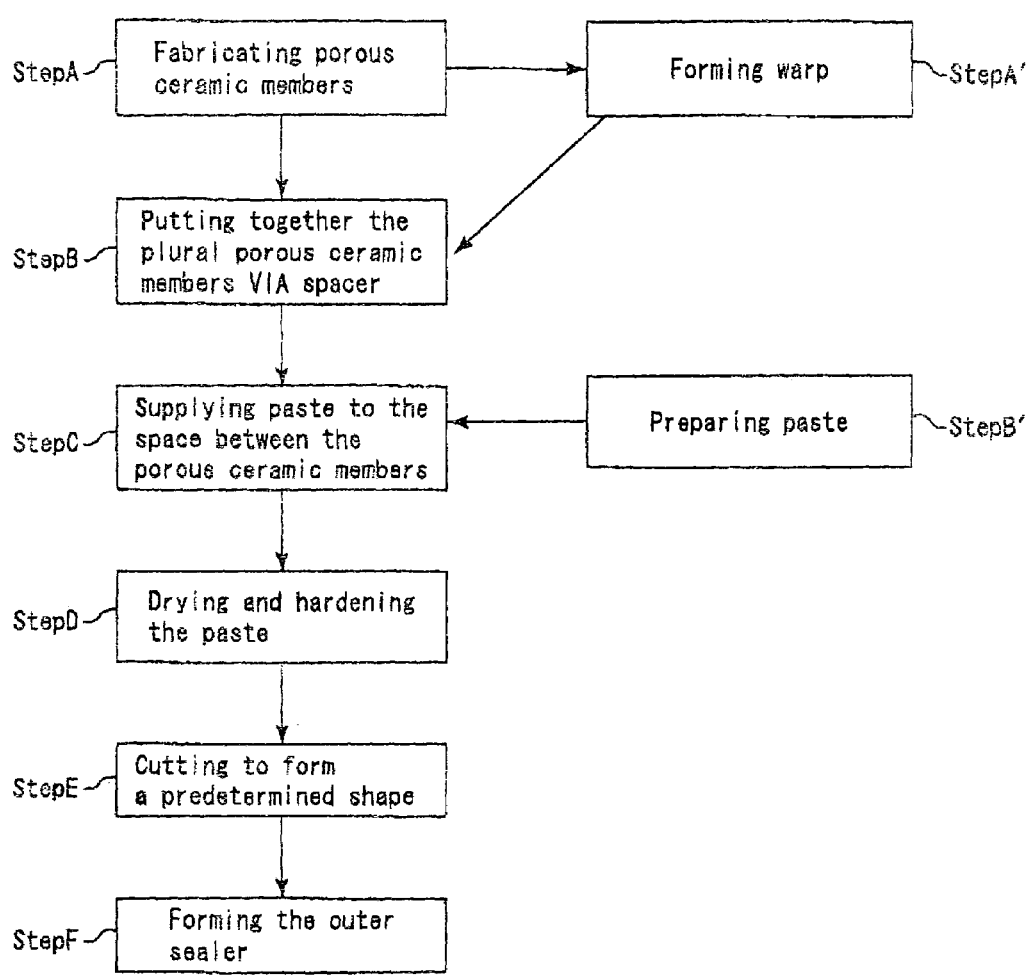
FIG. 11 is a block diagram illustrating a method of manufacturing a ceramic structure according to one embodiment of the present invention.

FIG. 11 illustrates a block diagram of a method of manufacturing the ceramic structure according to one embodiment of the present invention. FIGS. 12A to 12F give the illustrations of the processes in the block diagram of FIG. 11. First, the porous ceramic members 30 are fabricated (step A), then the plural porous ceramic members 30 are put together by using a spacer 142 to produce a ceramic member assembly 16 (step B). When the porous ceramic members 30 having warping are used, a warp forming step to be discussed later is performed (step A'). A paste 1400 (bonding material) to be the adhesive 140 is prepared (step B'). Next, the prepared paste 1400 is supplied to the space 141 between the porous ceramic members 30 (step C). Then, the paste 1400 is dried and hardened to be the adhesive 140 by which the porous ceramic members 30 are bonded to one another (step D). Further, the outer surface of the ceramic member assembly 16 is cut to form a predetermined shape (for example, a circle in FIG. 12) (step E). A paste is applied to the outer surface SA, thereby forming the outer sealer 13 (step F).

According to the manufacturing method illustrated in the block diagram in FIG. 11 and the process diagrams in FIGS. 12A to 12F, a plurality of porous ceramic members 30 are put together via the spacers 142. Hence, the misalignment of the porous ceramic members 30 is more effectively prevented, and thus the ceramic structure 10 is manufactured with a higher assembling precision. Further, the use of the method of filling the paste 1400 in the spaces formed by the spacers 142 allows the adhesives 140 to be formed more uniformly, and therefore the ceramic structure 10 with higher rigidity against the pressure is manufactured as mentioned above.

When the ceramic structure 10 according to this embodiment of the present invention is manufactured by the manufacturing method described above, the volume or length LM (FIGS. 5 and 10) of the unfilled portion 143 where the adhesive 140 is not present is adjusted by varying the amount of the adhesive paste 1400 to be supplied. For example, the amount of the adhesive paste 1400 is adjusted such that the adhesive paste 1400 is supplied only to the bonding portion 145 of each of the porous ceramic members 30. This is therefore more advantageous in manufacturing the ceramic structure 10 illustrated in the cross-sectional view in FIG. 5 that has the unfilled portion 143.

The method will now be described step by step.

(A: Fabrication of Porous Ceramic Member)

A ceramic compact is prepared by mixing a ceramic powder, a resin, a binder, a dispersion medium solution, etc. to prepare a mixed composition, performing extrusion molding of the mixed composition, and then drying the acquired compact to evaporate the dispersion medium solution or the like. While the ceramic compact is comprised mainly of the ceramic powder and the binder, and the resin as needed, it may contain a slight amount of dispersion medium solution.

The ceramic powder is not particularly limited, and it is possible to use various ceramics the desirable one of which is silicon carbide excellent in heat resistance and mechanical characteristic and a high thermal conductance. The particle size of the ceramic powder is not particularly limited, but the ceramic powder which contracts less in a later baking process is preferable. For example, the mixture of 100 wt % of a powder having an average particle size of about 0.3 µm to about 50 µm or the like and about 5 wt % to about 65 wt % of a powder having an average particle size of about 0.1 µm to about 1.0 µm or the like is desirable.

The binder is not particularly limited, and methyl cellulose, carboxymethyl cellulose, hydroxymethyl cellulose, polyethylene glycol, phenolic resin, epoxy resin and so forth, for example, are available. It is desirable that the blend amount of the binder ranges from about 1 wt % to about 10 wt % or the like with respect to 100 wt % of the ceramic powder, for example.

The dispersion medium solution is not particularly limited; for example, an organic solvent such as benzene, alcohol such as methanol, and water are available. The preferable amount of the dispersion medium solution is blended in such a way that the viscosity of the mixed composition lies within a given range, thereby adjusting the ceramic paste.

The ceramic paste is poured into a predetermined mold and subjected to extrusion molding. The ceramic compact has multiple through holes provided side by side in the longitudinal direction with partitions in between.

The shape of the ceramic compact is not particularly limited; for example, the ceramic compact may have approximately the same shape as the porous ceramic member 30 shown in FIGS. 2A and 2B or may be an oval columnar shape or a prism shape. That portion of the ceramic compact which is equivalent to the sealing material 32 is a cavity.

Next, a through hole sealing step is carried out to seal the through holes of the ceramic compact into a sealing pattern with a sealing paste. At the through hole sealing step, a mask having openings formed in the sealing pattern is placed against the end face of the ceramic compact and the sealing paste is injected into the through holes through the openings of the mask, thereby sealing predetermined through holes with the sealing paste. Although the sealing paste is not particularly limited, it is desirable that the sealing paste is similar to the mixed composition used at the time of preparing the ceramic compact or the mixed composition further added with a dispersion medium solution.

Then, a degreasing step is carried out to thermally decompose the binding, the resin component and the like in the ceramic compact. At the degreasing step, for example, the ceramic compact is placed on a degreasing device, which is in turn put into a degreasing furnace and heated at about 400° C. to about 650° C. under the oxygen-containing atmosphere. As a result, the resin component such as the binder is volatilized and decomposed to vanish, so that nearly the ceramic powder alone remains in the ceramic compact.

Next, a baking step of placing the degreased ceramic compact on a baking device and baking the ceramic compact is performed. At the baking step, the degreased ceramic compact is heated at about 2000° C. to about 2200° C. under the atmosphere of an inert gas like nitrogen or argon to bake the ceramic powder, thus yielding the columnar porous ceramic member 30 having multiple through holes 31 provided side by side in the longitudinal direction with partitions in between, as shown in FIG. 6A.

At a series of processes from the degreasing step to the baking step, it is desirable to place the ceramic compact on the baking device and puts the ceramic compact to the degreasing step and the baking step in that state. This is because the degreasing step and the baking step are executed efficiently and the ceramic compact is prevented from being damaged, for example, at the time when the ceramic compact is placed on one device to another.

As mentioned earlier, as the porous ceramic member 30, ceramic foam may be used. Ceramic foam may be prepared as follows. First, a ceramic paste is impregnated into urethane foam or the like. Then, the resultant structure is baked at about 2000° C. to about 2200° C. to decompose and eliminate urethane and bake the ceramic powder. Through the step, the ceramic foam as shown in FIG. 6B is acquired.

(A': Warping Forming Step)

The ceramic backed article may be warped by employing a method of using a warped plate used as the degreasing device and the baking device and placing the ceramic compact on the plate at the degreasing step and the baking step. This method allows one to obtain a desirable degree of warping by adjusting with the amount of warping of the plate. The warping of the porous ceramic member 30 may be accomplished by physically bending the ceramic compact.

(B: Step of Putting Porous Ceramic Members Together Via Spacers)

After the porous ceramic members 30 are fabricated, the porous ceramic members are put together via the spacers 142 to form the ceramic member assembly 16 according to the method of manufacturing the ceramic structure as described above.

The spacer 142 is used to form spaces between the porous ceramic members 30, and the thickness of the adhesive 140 between the porous ceramic members 30 is adjusted by varying the thickness of the spacer 142.

The material of the spacer 142 is not particularly limited, and, for example, paper, an inorganic substance, ceramics, an organic fiber, a resin or the like are available. It is however desirable that the material is not decomposed and eliminated by the heat applied when the ceramic structure 10 is used in order to prevent the adhesive 140 from being corroded by the gas that is generated at the time of decomposition and elimination of the material. It is to be noted that a material which is decomposed and eliminated by heat may be used as long as the material does not produce a corrosive gas. Specific examples of the material for the spacer 142 are cardboard, graphite, silicon carbide and the like. Alternatively, the same material as used for the adhesive 140 and with the thickness adjusted beforehand may be used as the spacer 142.

The spacer 142 may have a viscosity or an adhesive property, or may be a layer of a viscous or adhesive material formed on both sides of a base made of any one of the aforementioned materials. The use of the spacer 142 having a viscosity or an adhesive property allows the ceramic member assembly 16 having the porous ceramic members put together outside an assembly device such as the device 50 to be placed inside the assembly device without particularly using a jig or the like for securing the ceramic member assembly 16, and facilitates the step of placing the ceramic member assembly 16 into the assembly device, thereby preventing misalignment of the porous ceramic members 30 more effectively.

The shape of the spacer 142 is not particularly limited as long as it holds the porous ceramic member 30, and may be a columnar shape, a prism shape or the like.

The size of the spacer 142 is not particularly limited. When the spacer 142 is columnar, for example, it is desirable that the thickness ranges from about 0.5 mm to about 3.0 mm, for the thermal conductance of ceramics does not fall within that range. It is more desirable that the thickness of the spacer 142 is equal to or less than about 2.0 mm.

When the spacer 142 is columnar, it is desirable that the diameter is about 3.0 mm to about 10.0 mm, for the connecting strength of the porous ceramic members 30 is secured sufficiently.

While the location on the porous ceramic member 30 where the spacer 142 is placed is not particularly limited, it is desirable that the spacers 142 are placed at four corners of the side surfaces of the porous ceramic member 30, because such an arrangement connects the porous ceramic members 30 in parallel.

At the time of connecting the warped porous ceramic members 30 or the porous ceramic members 30 having curved side surfaces, the porous ceramic members 30 may be connected in parallel by properly changing the thicknesses of the spacers 142 at the individual positions.

At the step of placing the ceramic member assembly 16 in the assembly device, the ceramic member assembly 16 having plural porous ceramic 30 members put together via the spacers 142 to form the ceramic member assembly 16 is prepared by placing the spacers 142 between the porous ceramic members 30 to connect the porous ceramic members 30 together.

(B': Paste Preparing Step)

The adhesive paste 1400 to be used in the filling step is not particularly limited, but it is desirable that the adhesive paste 1400 has an excellent heat resistance, a relatively high thermal conductance and an adhesive property. For example, the adhesive paste including an inorganic binder, an organic binder, an inorganic fiber and/or inorganic particles or the like is preferably used.

The inorganic binder is not particularly limited; for example, silica sol, alumina sol and the like are available. Those materials may be used alone or two or more of them may be used together. Of the materials, silica sol is desirable.

The organic binder is not particularly limited, but hydrophilic organic polymers are desirable. Of hydrophilic organic polymers, polysaccharide is desirable. Specifically, polyvinyl alcohol, methyl cellulose, ethyl cellulose, carboxymethyl cellulose and the like are available. Of the materials, carboxymethyl cellulose is particularly desirable, for it enhances the fluidity of the adhesive paste 1400 at the time of press fitting and shows an excellent adhesion property in the ordinary temperature area.

The inorganic fiber is not particularly limited; for example, a silica-alumina ceramic fiber, mullite fiber, alumina fiber and silica fiber are available. Such an inorganic fiber, when interwound with an inorganic binder, or an organic binder or the like, can improve the adhesion strength of the adhesive paste 1400.

While the inorganic particles are not particularly limited, it is desirable that the inorganic particles include carbide and/or nitride, for example. The carbide and nitride have very high thermal conductivities which can considerably contribute to an improvement of the thermal conductivity of the adhesive 14.

The adhesive paste 1400 may contain a slight amount of water or solvent or the like in addition to an inorganic binder, an organic binder, an inorganic fiber and inorganic particles, but such water or solvent or the like is mostly scattered by heat or the like generated in an adhesive paste hardening step to be discussed later or other steps.

The viscosity of the adhesive paste 1400 is not particularly limited, but the desirable lower limit is about 40 Pa·s and the desirable upper limit is about 50 Pa·s. When the viscosity exceeds about 50 Pa·s, the adhesive paste 1400 may not be evenly filled in the spaces 141 between the porous ceramic members 30 that constitute the ceramic member assembly 16. When the viscosity is less than about 40 Pa·s, the press-fitted adhesive paste 1400 may leak out from the end faces of the ceramic member assembly 16 and adhered to the end faces.

(C: Paste Supplying Step)

Figure 12A:
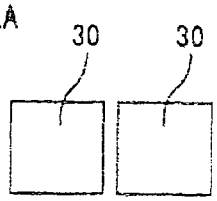
FIGS. 12A to 12F are process diagrams illustrating, step by step, the method of manufacturing a ceramic structure.
Figure 12D:
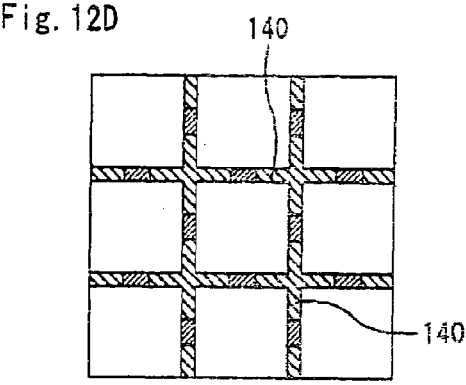
Figure 12B:
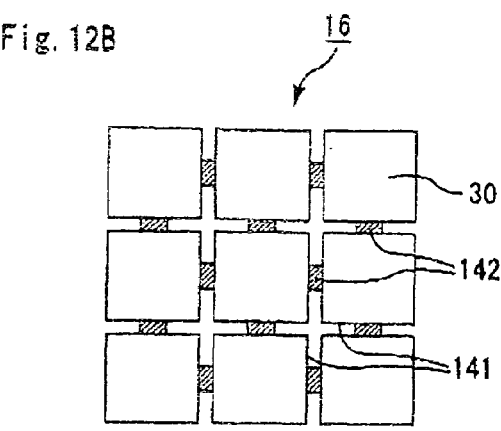
Figure 12E:
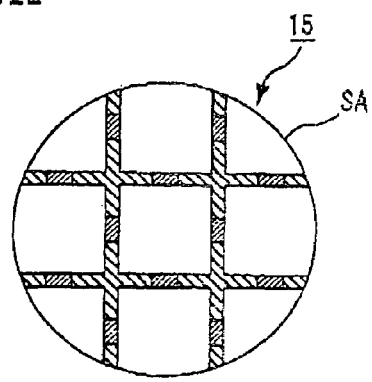
Figure 12C:
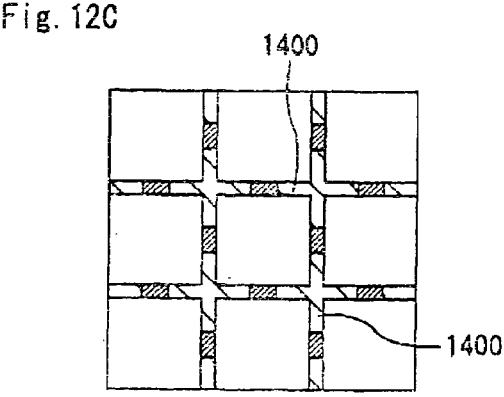

As shown in FIG. 12C, the adhesive paste 1400 is supplied in the spaces 141 between the porous ceramic members 30 that constitute the ceramic member assembly 16. The supplying may be carried out with the ceramic member assembly 16 retained in a paste supplying cylindrical assembly device to be discussed later, or the porous ceramic member 30 may be put together in an assembly device. The use of such an assembly device is advantageous because the length LM of the unfilled portion 143 where the adhesive paste 1400 is not filled from the end face (see FIGS. 5 and 10) is easily adjusted by varying the amount of the adhesive paste 1400 to be press-fitted. The use of the paste supplying cylindrical assembly device to be discussed later is advantageous because the device prevents the adhesive paste from being adhered to the end face portions of the ceramic structure 10 without using a masking material, and therefore the number of steps is reduced.

(D: Paste Drying/hardening Step)

As shown in FIG. 12D, the adhesive paste 1400 supplied to the spaces 141 between the porous ceramic members 30 is hardened to form the adhesive 140 between the porous ceramic members 30.

At the step, the ceramic member assembly 16 with the adhesive paste 1400 supplied therein to heated at, for example, about 50° C. to about 150° C. for about one hour to dry and harden the adhesive paste 1400 into the adhesive 140.

(E: Outer Surface Processing Step).

As shown in FIG. 12E, according to the method of manufacturing the ceramic structure 10, after the adhesive paste hardening step, the outer surface of the resultant structure is cut away to the desired shape like a columnar shape or the like, thereby preparing the ceramic block 15.

(F: Outer Sealer Layer Forming Step)

Figure 12F:
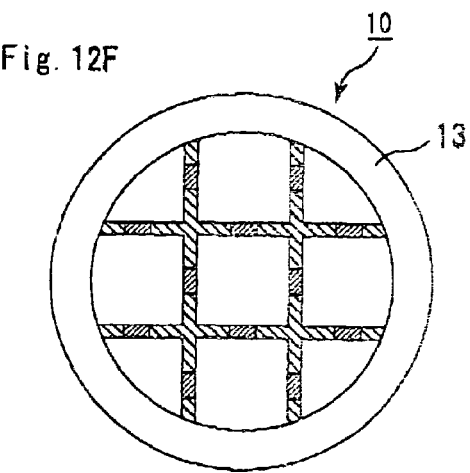

As shown in FIG. 12F, the outer sealer 13 is formed on the outer surface SA, thus completing the process of manufacturing the ceramic structure 10.

The method of forming the outer sealer 13 is not particularly limited, and, for example, one method is available which uses a support member having rotary means, causes the ceramic block 15 to be supported and rotated around the rotary shaft in the direction of the rotary shaft, applies a pat of the sealer paste to be the outer sealer 13 to the outer surface of the rotating ceramic block 15, spreads the applied sealer paste all over the outer surface of the ceramic block 15, then dries the resultant structure at a temperature of about 120° C. or higher to evaporate water.

The sealer paste to be the material for the outer sealer 13 is not particularly limited; for example, a paste or the like having a composition similar to the composition of the adhesive paste 1400 which is the material for the adhesive 140 is available.

Figure 13A:
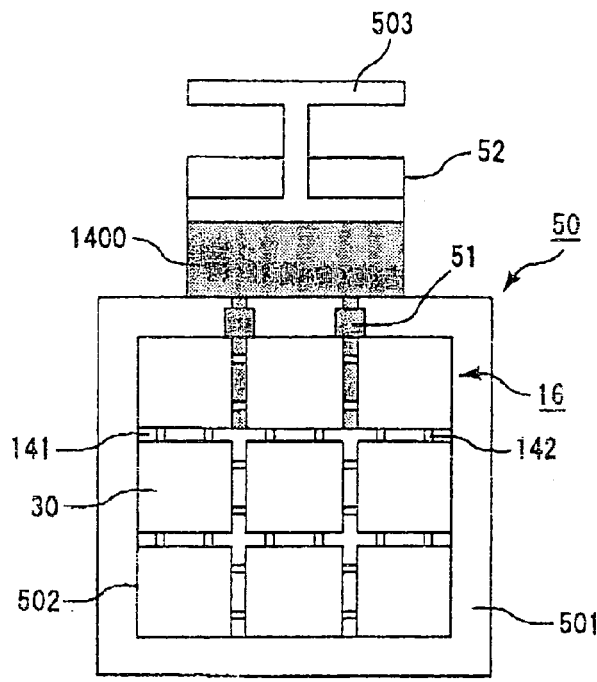
FIG. 13A is a cross-sectional view perpendicular to the longitudinal direction of a device for manufacturing a ceramic structure according to one embodiment of the present invention.
Figure 13B:
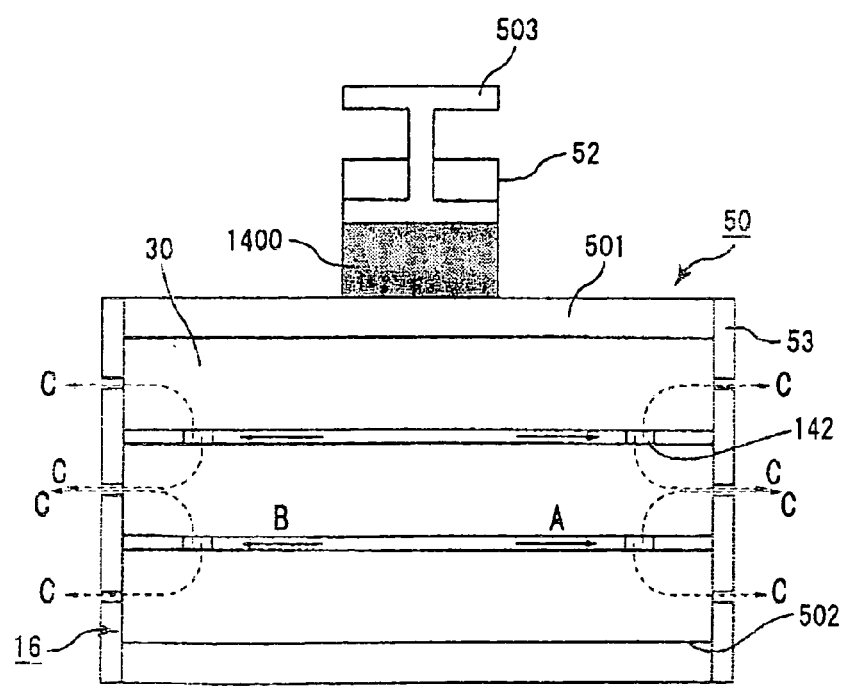
FIG. 13B is a cross-sectional view parallel to the longitudinal direction of the device.

FIG. 13A is a cross-sectional view exemplarily showing one example of a paste supplying assembly device 50 and the cross section of the ceramic member assembly 16 placed on the interior portion of the paste supplying assembly device (hereinafter, simply referred to as "device") 50, taken along a direction perpendicular to the longitudinal direction of the ceramic member assembly 16, and FIG. 13B is a cross-sectional view exemplarily showing one example of the device 50 and the cross section of the ceramic member assembly 16 placed in the interior portion of the device 50, taken along a direction parallel to the longitudinal direction of the ceramic member assembly 16. The device 50 has a cylindrical body 501 (assembly unit) having internal space 502 to accommodate and retain the ceramic member assembly 16. A paste supplying chamber 52 (supply unit) is attached to the outer side surface of the cylindrical body 501. Openings 51 which connect the paste supplying chamber 52 to the internal space 502 are formed in the cylindrical body 501, and a paste is supplied through the openings (hereinafter, also referred to as "supply holes" or "supply grooves")

51. Attached to the paste supplying chamber 52 is an extrusion mechanism 503 for extruding the paste 1400. End plates 53 of an open/close type are attached to both end portions of the cylindrical body 501. When the end plates 53 are closed to block the spaces 141 formed between the porous ceramic members 30 that constitute the ceramic member assembly 16, the adhesive paste 1400 is prevented from being adhered to the end faces of the ceramic member assembly 16. As the gas in the device 50 is discharged through both end faces of the device 50 at the time the adhesive paste 1400 is press-fitted in the device 50 at the adhesive paste supplying step, the end plates 53 include a material having gas permeability or an airtight material having air holes. According to this embodiment of the present invention, because of the use of the porous ceramic members 30, it is desirable that the end plates 53 include an airtight material having air holes. In this case, the gas inside the device 50 passes through the partitions of the porous ceramic members 30 as indicated by an arrow C in FIG. 13B, and further passes through the air holes of the end plates 53 from the porous ceramic members 30 and leaks outside. Referring to FIGS. 13A and 13B, when a material having air holes is used for the end plates 53, the flow of the adhesive paste 1400 press-fitted is indicated by arrows A and B, and the flow of the gas to be discharged outside from inside the device 50 is indicated by the broken-line arrow C.

As the adhesive 140 is formed by using the device 50, the adhesive paste 1400 is prevented from being adhered to the end face portions of the ceramic structure without using a masking material, thereby reducing the number of steps.

The device 50 is not particularly limited as long as it has a body whose outer surface is provided with the paste supplying chamber 52 communicating with the interior portion via the supply holes (or the supply grooves) 51 and inside of which the ceramic member assembly 16 can be built up. For example, an assemble type jig which can be disassembled, an integrated jig, or a jig whose interior portion has a predetermined size and/or a predetermined shape such as a cylindrical shape may be used. Another jig whose interior portion has a changeable size and/or a changeable shape, so that as its inner surface is narrowed, the ceramic member assembly 16 is tightened. The device 50 may be an assemble type to permit removable of the paste supplying chamber 52.

When the device 50 is a dismantlable assembling type jig or a jig whose interior portion has a changeable size and/or a changeable shape, it allows one to execute the step of preparing the ceramic member assembly 16 by putting plural porous ceramic members 30 together inside the device 50. Of course, the ceramic member assembly 16, after prepared, may be placed inside the device 50.

The paste supplying chamber 52 is not particularly limited as long as it is a container which is provided at the outer surface of the device 50 and in which the adhesive paste 1400 can be injected and pressed.

Although the shape, size and quantity of the supply holes 51 are not particularly limited, the supply holes 51 are provided at positions corresponding to the spaces 141 formed between the porous ceramic members 30 that constitute the ceramic member assembly 16 and it is desirable that the supply holes 51 are provided at given intervals in such a way that the spaces 141 are filled with the adhesive paste 140 as desired. It is more desirable that the supply holes 51 are the supply grooves 51 so as to permit uniform filling of the paste.

The pressure at the time of press-fitting the adhesive paste 1400 into the device 50 is adequately adjusted according to the amount and viscosity of the adhesive paste 1400 to be press-fitted, and the size, positions and quantity or the like of the supply holes, and suction from both end faces of the device 50 may be used together as needed.

The use of the device 50 permits the unfilled portions 143 at the end portions of the ceramic member assembly 16. It is advantages to provide the unfilled portions 143 as in this embodiment of the present invention because when the adhesive paste 1400 is filled in all the spaces 141, the press-fitted adhesive paste 1400 leaks out from the end faces of the ceramic member assembly 16 and is adhered to the end faces.

The device 50 may be used in the following manners. As shown in FIGS. 13A and 13B, the ceramic member assembly 16 is assembled outside the device 50 and then placed and retained in the device 50. Thereafter, the paste 1400 is injected. Alternatively, the ceramic member assembly 16 is assembled inside the device 50, and then the paste 1400 is injected.

Referring to the following non-limiting examples, the above mentioned embodiment of the present invention will be discussed in more details. In the examples discussed below, the ceramic structure is used as an exhaust gas clean-up ceramic filter. As the adhesive 140 serves as a sealer to prevent leakage of the exhaust gas, "sealer paste 1400" is also referred to as "adhesive paste 1400" and "sealer 140" is also referred to as "adhesive 140".

EXAMPLE 1

(1) 70 wt % of α type silicon carbide powder with an average particle size of 10 μm, 30 wt % of β type silicon carbide powder with an average particle size of 0.7 μm, 5 wt % of methyl cellulose, 4 wt % of a dispersion agent, and 20 wt % of water were blended and evenly mixed to prepare a mixed composition as a source material. The mixed composition was filled in an extrusion molding machine and a ceramic compact with a honeycomb shape was prepared at the extrusion speed of 2 cm/min. The ceramic compact has a shape approximately similar to that of the porous ceramic member 30 shown in FIG. 3, and has a size of 33 mm×33 mm×254 mm, with the number of through holes being 31/cm$^2$ and the thickness of the partitions being 0.35 mm. In this example, the longitudinal length (254 mm) of the porous ceramic member 30 is obtained by measuring the distance between the end face SI on the inlet side and the end face SO on the outlet side and is represented in FIGS. 6A and 6B by the length of the horizontal LL-LL line.

(2) After the ceramic compact was dried using a dryer, the filler paste of the same composition as the mixed composition was filled in predetermined through holes in the ceramic compact. Then, the structure was degreased at 450° C., and further baked at 2200° C., fabricating the porous ceramic member 30. As the amount of warping of the carbon-made degreasing/baking device used then was set to 0.02 mm beforehand, the amount of warping of the porous ceramic member 30 was set to 0.02 mm.

(3) Next, 18 wt % of silica sol (SiO$_2$ content in the sol: 30 wt %) as an inorganic binder, 4 wt % of carboxymethyl cellulose as an organic binder, 36 wt % of a silica-alumina ceramic fiber (shot content ratio of 3% and a fiber length of 0.1 to 100 mm) as an inorganic fiber, 24 wt % of silicon carbide as inorganic particles, and 18 wt % of water were mixed and kneaded to prepare the sealer paste 140. The viscosity of the sealer paste 140 was 45 Pa·s at room temperature.

(4) Next, a total of four spacers 142 made of a cardboard of 5 mm in diameter and 1 mm in thickness and having an adhesive applied to both sides were placed, one to one, near the four corners of the side surfaces of the porous ceramic member 30, and were secured. Specifically, the spacers 142 were placed and secured at such positions that the shortest distance between the outer surface of the spacer 142 and the two sides that would form each corner on the side surface became 6.6 mm. Then, 4 vertical×4 horizontal porous ceramic members 30 were put together via the spacers 142 to make the ceramic member assembly 16.

(5) Next, the ceramic member assembly 16 was placed in the device 50 which had the paste supplying chamber 52 provided at the outer surface and whose inner surface portion had a size of 135 mm vertical×135 mm horizontal× 254 mm in length. The cylindrical device 50 had three supply grooves of 5 mm wide which would connect the interior of the paste supplying chamber 52 to the interior of the device 50, at positions corresponding to the spaces 141 formed between the porous ceramic members 30 constituting the ceramic member assembly 16. The open/close type end plates 53 abuttable on the end faces were respectively attached to both end portions of the device 50, and the spaces 141 between the porous ceramic members 30 were sealed by closing the end plates 53 and making the end plates 53 abut on both end faces of the ceramic member assembly 16.

(6) Next, the sealer paste 1400 was supplied into the paste supplying chamber 52 of the device 50 and was press-fitted into the device 50 at a pressure of 0.2 MPa, so that filling the sealer paste 1400 was filled in the voids between the porous ceramic members 30. The amount of the sealer paste 1400 to be press-fitted was adjusted in such a way that the length from the end face of the sealer-paste unfilled portion where the sealer paste 1400 was not filled, at either end portion of the ceramic member assembly 16 after press fitting of the sealer paste 1400 became 1.5 mm (1% with respect to the entire length of the ceramic member assembly 16). Then, the ceramic member assembly 16 having the sealer paste 1400 filled between the porous ceramic members 30 was dried at 100° C. for one hour to harden the sealer paste 1400 to form the sealers 14 of 1 mm in thickness, thereby completing the ceramic member connected body.

(7) Next, the ceramic member connected body was cut to a column 15 of 135 mm in diameter using a diamond cutter, then the sealer paste 1400 was applied to the outer surface of the of the column 15 and dried, thereby forming the outer sealer 13, made of the same composition as the composition of the sealers 14, on the outer surface, which completed the manufacture of the ceramic (honeycomb) structure 10 made of porous silicon carbide.

EXAMPLES 2 TO 9 AND REFERENCE EXAMPLES 1 TO 6

The ceramic structures 10 of porous silicon carbide were manufactured in the same way as done for Example 1, except for the changes in the amount of warping of the porous ceramic members 30 and in the length LM of the sealer-paste unfilled portion at either end portion of the ceramic member assembly 16 measured after press fitting the sealer paste 1400 as shown in Table 1.

The amount of warping of the porous ceramic members 30 was adjusted by changing the amount of warping of the degreasing/baking device. The length from the end face of the sealer-paste unfilled portion was adjusted by changing the amount of the sealer paste 1400 to be press-fitted.

EXAMPLES 10 TO 12 AND REFERENCE EXAMPLES 7 AND 8

The ceramic structures 10 of porous silicon carbide were manufactured in the same way as done for Example 1, except that the amount of warping of the porous ceramic members 30 was changed, that the length from the end face of the sealer-paste unfilled portion at either end portion of the ceramic member assembly 16 after press fitting of the sealer paste 1400 was changed, and that the thickness of the spacers 142 made of a cardboard was changed to 2.0 mm, as shown in Table 1.

The amount of warping of the porous ceramic members 30 was adjusted by changing the amount of warping of the degreasing/baking device. The length from the end face of the sealer-paste unfilled portion was adjusted by changing the amount of the sealer paste 1400 to be press-fitted.

EXAMPLES 13 TO 15 AND REFERENCE EXAMPLES 9 AND 10

The ceramic structural bodies 10 of porous silicon carbide were manufactured in the same way as done for Example 1, except that at the steps (4) and (5), the ceramic member assembly 16 was constructed inside the device 50 and the spaces 141 between the porous ceramic members 30 were sealed by closing the end plates 53 and making the end plates 53 abut on both end faces of the ceramic member assembly 16, and then the step (6) was carried out.

It is to be noted that at the step (2), the amount of warping of the porous ceramic member 30 was set to 0 mm by setting the amount of warping of the carbon-made degreasing/baking device to 0 mm beforehand, and the length LM of the sealer-paste unfilled portion at either end portion of the ceramic member assembly 16 measured after press fitting the sealer paste 1400 was varied as given in Table 1.

The length from the end face of the sealer-paste unfilled portion was adjusted by changing the amount of the sealer paste 1400 to be press-fitted.

EXAMPLE 16

(1) 70 wt % of α type silicon carbide powder with an average particle size of 10 μm, 30 wt % of β type silicon carbide powder with an average particle size of 0.7 μm, 5 wt % of methyl cellulose, 4 wt % of a dispersion agent, and 100 wt % of water are blended and evenly mixed to prepare a mixed composition as a source material. The mixed composition is impregnated into urethane foam with a size of 33 mm×33 mm×254 mm.

(2) After the urethane foam is dried using a dryer, the resultant structure is degreased at 450° C., and further baked at 2200° C. to thermally decompose and eliminate the urethane foam, thus fabricating the porous ceramic member 30 made of ceramic foam. The amount of warping of the porous ceramic member 30 is set to 2 mm by setting the amount of warping of the carbon-made degreasing/baking device used then is set to 2 mm beforehand.

(3) Next, 18 wt % of silica sol ($SiO_2$ content in the sol: 30 wt %) as an inorganic binder, 4 wt % of carboxymethyl cellulose as an organic binder, 36 wt % of a silica-alumina ceramic fiber (shot content ratio of 3% and a fiber length of 0.1 to 100 mm) as an inorganic fiber, 24 wt % of silicon carbide as inorganic particles, and 18 wt % of water are mixed and kneaded to prepare the sealer paste 1400. It is predicted from the experience of the inventor that the viscosity of the sealer paste 1400 becomes approximately from 30 to 50 Pa·s at room temperature.

(4) Next, a total of four spacers 142 made of a cardboard of 5 mm in diameter and 1 mm in thickness and having an adhesive applied to both sides are placed, one to one, near the four corners of the side surfaces of the porous ceramic member 30, and are secured. Specifically, the spacers 142 are placed and secured at such positions that the shortest distance between the outer surface of the spacer 142 and the two sides that form each corner on the side surface becomes 6.6 mm. Then, 4 vertical×4 horizontal porous ceramic members 30 are put together via the spacers 142 to make the ceramic member assembly 16.

(5) Next, the ceramic member assembly 16 is placed in the device 50 which has the paste supplying chamber 52 provided at the outer surface and whose inner surface portion has a size of 135 mm vertical×135 mm horizontal×150 mm in length. The cylindrical device 50 has three supply grooves of 5 mm wide which connect the interior of the paste supplying chamber 52 to the interior of the device 50, at positions corresponding to the spaces 141 formed between the porous ceramic members 30 constituting the ceramic member assembly 16.

(6) Next, the sealer paste 1400 is supplied into the paste supplying chamber 52 of the device 50 and press-fitted into the device 50 at a pressure of 0.2 MPa, so that filling the sealer paste 1400 is filled in the spaces 141 between the porous ceramic members 30. The amount of the sealer paste 1400 to be press-fitted is adjusted in such a way that the length from the end face of the unfilled portion 143 where the sealer paste 1400 is not filled, at either end portion of the ceramic member assembly 16 after press fitting of the sealer paste 1400 becomes 1.5 mm (10% with respect to the entire length of the ceramic member assembly 16). Then, the ceramic member assembly 16 having the sealer paste 1400 filled between the porous ceramic members 30 is dried at 100° C. for one hour to harden the sealer paste 1400 to form the sealers 14 of 1 mm in thickness, thereby completing the ceramic member connected body.

(7) Next, the ceramic member connected body is cut to a columnar ceramic block 15 of 135 mm in diameter using a diamond cutter, then the sealer paste 1400 is applied to the outer surface of the columnar ceramic block 15 and dried, thereby forming the outer sealer 13, made of the same composition as the composition of the sealers 14, on the outer surface, which completes the manufacture of the ceramic structure 10 made of porous silicon carbide.

For Example 16, it is expected from the results of measurements taken for Examples 1 to 15 that the extrusion strength (the strength against the pressure) is approximately 800 kg to 1000 kg.

COMPARATIVE EXAMPLES 1 TO 5

With regard to the steps (1) and (2), the porous ceramic members were fabricated in the same manner as done in the Examples.

(3) Next, 15 wt % of silica sol ($SiO_2$ content in the sol: 30 wt %) as an inorganic binder, 5.6 wt % of carboxymethyl cellulose as an organic binder, 30 wt % of a silica-alumina ceramic fiber (shot content ratio of 3% and a fiber length of 0.1 to 100 mm) as an inorganic fiber, 21 wt % of silicon carbide as inorganic particles, and 28.4 wt % of water were mixed and kneaded to prepare the sealer paste 1400. The viscosity of the sealer paste 1400 was 45 Pa·s at room temperature.

(4) Next, the masking material was adhered to the end faces of the ceramic structure 10. Then, the porous ceramic member 30 is placed inclined on the table 60 having a V-shaped cross section, the sealer paste to be the material for the adhesive paste layer 61 was applied to two side surfaces 30a and 30b facing upward in such a way as to have a uniform thickness, the spacers 142 made of thick paper or the like were placed on the paste, forming the adhesive paste layer 61. Thereafter, the other porous ceramic members 30 were stacked on the adhesive paste layer 61 in order, then the resultant structure was dried at 100° C. for one hour to harden the sealer paste, thereby forming a sealer layer, yielding a ceramic member connected body having the lamination of plural porous ceramic members 30. The masking material was removed after application of the sealer paste.

(5) Next, the ceramic structure was manufactured in the same way as done in the step (7) for the Examples.

The ceramic structural bodies according to the Examples, Reference Examples and Comparative Examples were evaluated by the following method. The results are shown in Table 1.

(1) Measurement of the Extrusion Strength After the Temperature Cycle Test

Figure 14:
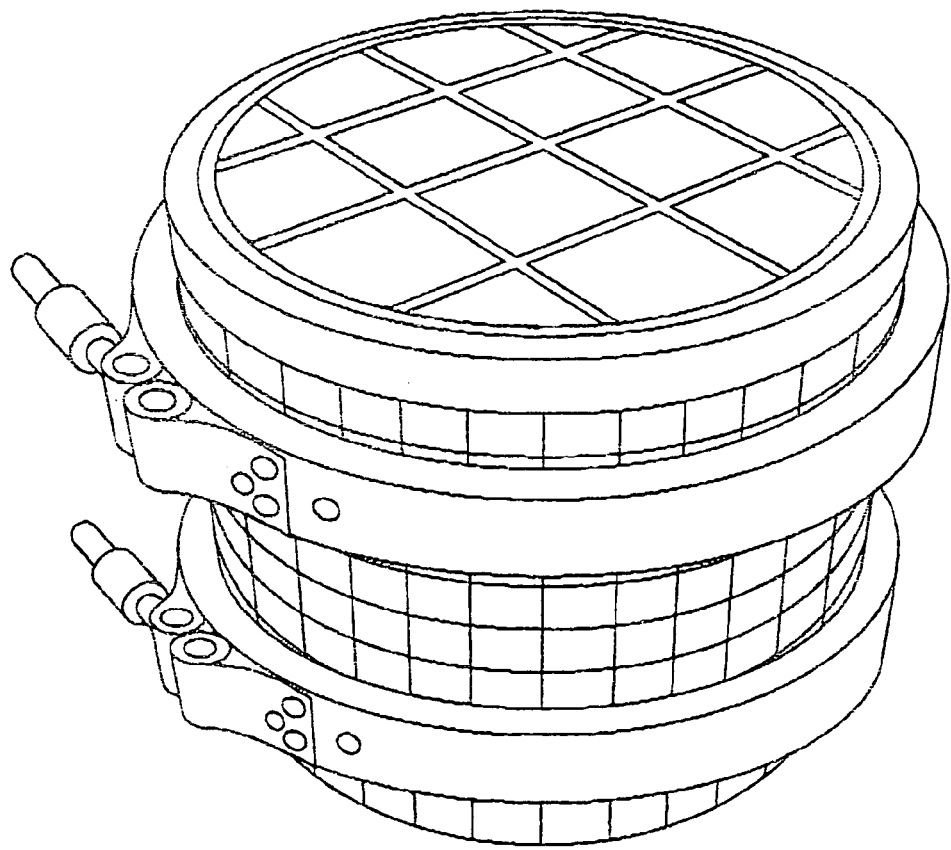
FIG. 14 is a schematic illustration showing a ceramic structure used in a temperature cycle test.

The ceramic structural bodies according to the Examples and Reference Examples were wrapped with a heat insulating mat made of an alumina fiber having a thickness of 7 mm (MAFTEC produced by Mitsubishi Chemical Corporation), and was tightened and secured with a metal net and belt so that the heat insulating mat would not open (see FIG. 14)

The ceramic structural bodies were heated in an electric furnace to 600° C. at a temperature rising speed of 10° C./min, were then held at that temperature for 30 minutes, were then subjected to the temperature cycle test to rapidly cool down to room temperature (20° C.), and were then subjected to the extrusion rupture strength test to measure the extrusion strength (the breaking strength against the pressure). The results are shown in Table 1.

Figure 15A:
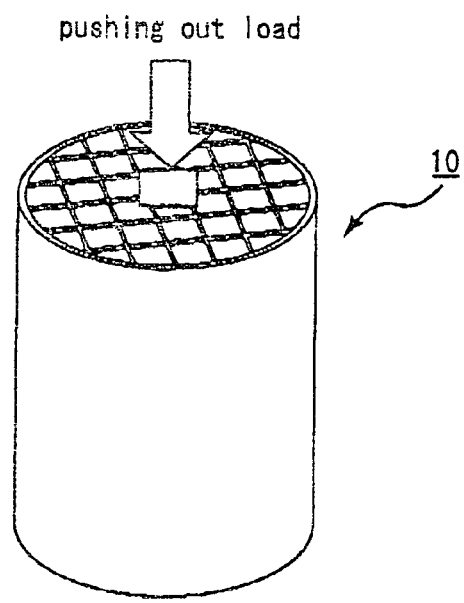
FIGS. 15A and 15B are schematic illustrations exemplarily showing a method of testing the extrusion strength of a ceramic structure.
Figure 15B:
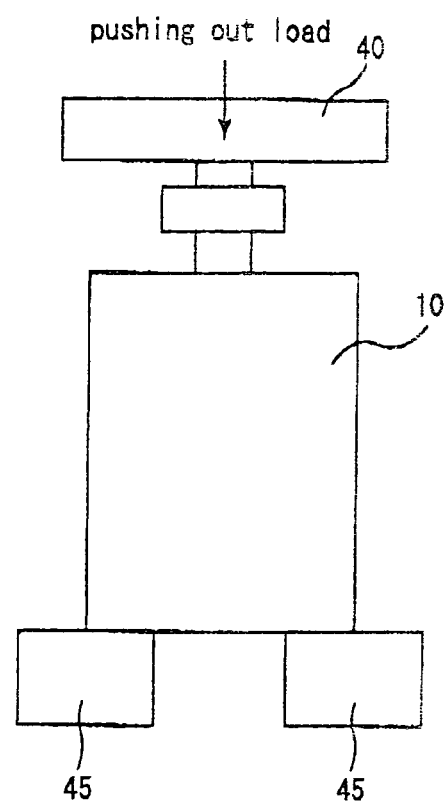

The "extrusion strength test" in the present specification is to place the ceramic structure 10 having the porous ceramic members connected via the adhesive on a table 45, to apply an extrusion load (pressing speed of 1 mm/min) with an aluminum jig 40 of 30 mm in diameter to the center porous ceramic member and to measure the strength (extrusion strength) against the pressure, as shown in FIGS. 15A and 15B, in order to check the strength of the adhesive. An Instron universal testing machine (model 5582) was used to measure the strength.

(2) Observation of Sealer

Figure 16A:
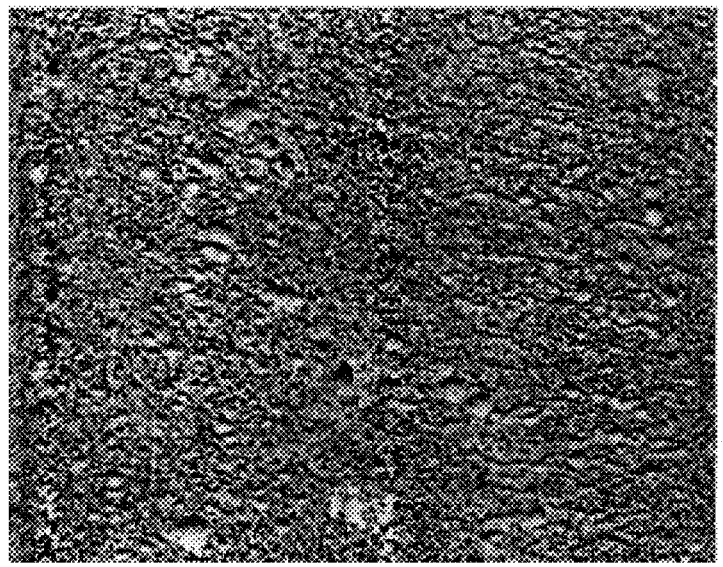
FIG. 16A is a photograph showing a surface of a ceramic structure of Reference Example 9.
Figure 16B:
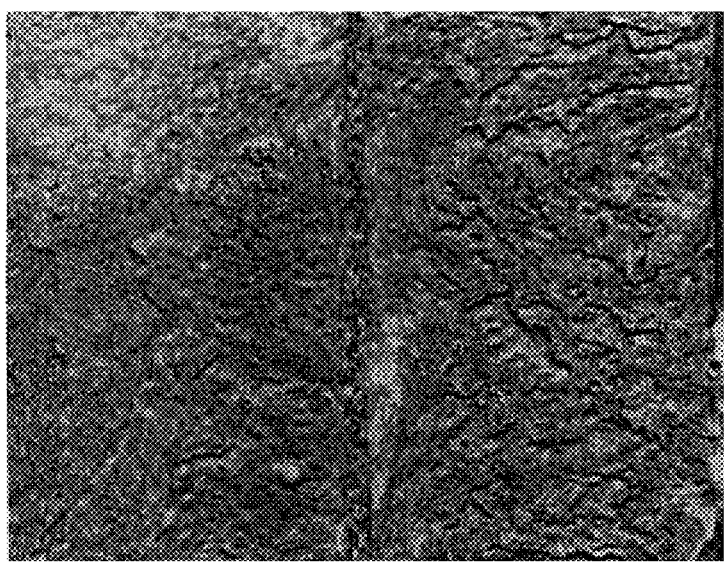
FIG. 16B is a photograph showing a surface of a ceramic structure of Comparative Example 1.

The ceramic structures 10 according to Reference Example 9 and Comparative Example 1 were cut and their surfaces were observed. The results are shown in FIGS. 16A and 16B.

(3) Visual Observation of Ceramic Structure

The ceramic structures according to Examples 13 to 15, Reference Examples 9 and 10, and Comparative Examples 1 to 5 were visually observed from their end faces to determine if there was misalignment of the porous ceramic members. The results are shown in Table 1.

TABLE 1

| | Length of ceramic structure (mm) | Warping in porous ceramic member Length (mm) | Warping in porous ceramic member Ratio of length (%) | Scheme | Adhesive unfilled portion Length (mm) | Adhesive unfilled portion Ratio of length (%) | Extrusion strength (kg) | Visual observation |
|---|---|---|---|---|---|---|---|---|
| Reference Example 1 | 254 | 0.02 | 0.00787 | Press fitting | 1.77 | 0.7 | 758 | |
| Example 1 | 254 | 0.02 | 0.00787 | Press fitting | 2.54 | 1.0 | 842 | |
| Example 2 | 254 | 0.02 | 0.00787 | Press fitting | 12.7 | 5.0 | 1000 | |
| Example 3 | 254 | 0.02 | 0.00787 | Press fitting | 25.4 | 10.0 | 832 | |
| Reference Example 2 | 254 | 0.02 | 0.00787 | Press fitting | 28 | 11.0 | 748 | |
| Reference Example 3 | 254 | 0.1 | 0.0393 | Press fitting | 1.77 | 0.7 | 732 | |
| Example 4 | 254 | 0.1 | 0.0393 | Press fitting | 2.54 | 1.0 | 853 | |
| Example 5 | 254 | 0.1 | 0.0393 | Press fitting | 12.7 | 5.0 | 1030 | |
| Example 6 | 254 | 0.1 | 0.0393 | Press fitting | 25.4 | 10.0 | 854 | |
| Reference Example 4 | 254 | 0.1 | 0.0393 | Press fitting | 28 | 11.0 | 740 | |
| Reference Example 5 | 254 | 0.8 | 0.3149 | Press fitting | 1.77 | 0.7 | 710 | |
| Example 7 | 254 | 0.8 | 0.3149 | Press fitting | 2.54 | 1.0 | 863 | |
| Example 8 | 254 | 0.8 | 0.3149 | Press fitting | 12.7 | 5.0 | 1100 | |
| Example 9 | 254 | 0.8 | 0.3149 | Press fitting | 25.4 | 10.0 | 876 | |
| Reference Example 6 | 254 | 0.8 | 0.3149 | Press fitting | 28 | 11.0 | 725 | |
| Reference Example 7 | 254 | 2.0 | 0.787 | Press fitting | 1.77 | 0.7 | 703 | |
| Example 10 | 254 | 2.0 | 0.787 | Press fitting | 2.54 | 1.0 | 870 | |
| Example 11 | 254 | 2.0 | 0.787 | Press fitting | 12.7 | 5.0 | 1150 | |
| Example 12 | 254 | 2.0 | 0.787 | Press fitting | 25.4 | 10.0 | 890 | |
| Reference Example 8 | 254 | 2.0 | 0.787 | Press fitting | 28 | 11.0 | 700 | |
| Reference Example 9 | 254 | 0 | 0 | Press fitting | 1.77 | 0.7 | 700 | No misalignment |
| Example 13 | 254 | 0 | 0 | Press fitting | 2.54 | 1.0 | 682 | No misalignment |
| Example 14 | 254 | 0 | 0 | Press fitting | 12.7 | 5.0 | 620 | No misalignment |
| Example 15 | 254 | 0 | 0 | Press fitting | 25.4 | 10.0 | 550 | No misalignment |
| Reference Example 10 | 254 | 0 | 0 | Press fitting | 28 | 11.0 | 500 | No misalignment |
| Comparative Example 1 | 254 | 0 | 0 | Stacking on table | 1.77 | 0.7 | 682 | Misaligned |
| Comparative Example 2 | 254 | 0 | 0 | Stacking on table | 2.54 | 1.0 | 620 | Misaligned |
| Comparative Example 3 | 254 | 0 | 0 | Stacking on table | 12.7 | 5.0 | 545 | Misaligned |
| Comparative Example 4 | 254 | 0 | 0 | Stacking on table | 25.4 | 10.0 | 503 | Misaligned |
| Comparative Example 5 | 254 | 0 | 0 | Stacking on table | 28 | 11.0 | 469 | Misaligned |

FIG. 16A shows the cross section of the adhesive layer (sealer layer) of the ceramic (honeycomb) structure according to Reference Example 9, and FIG. 16B shows the cross section of the sealer layer of the ceramic (honeycomb) structure according to Comparative Example 1.

As apparent from FIGS. 16A and 16B, the adhesive layer (sealer layer) of the ceramic structure acquired by the manufacturing method described above is relatively uniform and has bubbles of a more uniform shape, whereas the adhesive layer (sealer layer) of the ceramic structure acquired by the other manufacturing method is less uniform, has continuous bubbles, and is mainly separated into the portion where the bubbles are formed and the portion where the bubbles are not formed.

FIGS. 9A and 9B are side views exemplifying the layout of the porous ceramic members 30 constituting the ceramic (honeycomb) structure. In the ceramic (honeycomb) structural bodies according to Examples 13 to 15 and Reference Examples 9 and 10, the porous ceramic members are better aligned and are laid out more accurately as designed as shown in FIG. 9A, whereas the ceramic (honeycomb) structures according to Comparative Examples 1 to 5, the porous ceramic members are misaligned from the designed layout, as shown in FIG. 9B.

It is apparent from the comparison results that the sealer is filled more evenly in the ceramic (honeycomb) structural bodies according to Examples 2 to 15 and Reference Examples 1 to 10 and the porous ceramic members are less likely to be misaligned, and the ceramic (honeycomb) structures having a higher strength is manufactured, as compared with the ceramic (honeycomb) structures according to Comparative Examples 1 to 5.

In addition, it is found that when the porous ceramic members are warped, and sealer-layer unfilled portions are provided at the end portions of the ceramic (honeycomb) structures, the porous ceramic members are less likely to be misaligned and the ceramic (honeycomb) structure has a higher strength when the length from the end face of that portion to the adhesive (sealer) is about 1% to about 10% of the length of the ceramic (honeycomb) structure in the longitudinal direction.

Obviously, numerous modifications and variations of the present invention are possible in light of the above teachings. It is therefore to be understood that within the scope of the appended claims, the invention may be practiced otherwise than as specifically described herein.

What is claimed is:

1. A ceramic structure comprising:
a plurality of porous ceramic members provided in parallel in a longitudinal direction, each of the porous ceramic members being warped in a direction substantially perpendicular to the longitudinal direction and having end portions and a bonding portion between the end portions; and
an adhesive connecting the porous ceramic members,
wherein the porous ceramic members are connected by the adhesive on the bonding portion of each of the porous ceramic members.

2. The ceramic structure of claim 1, wherein each of the porous ceramic members has a plurality of through holes extending in the longitudinal direction and at least one gas permeable partition positioned between the plurality of through holes and configured to filter out particles in a gas entered from the plurality of through holes, and the through holes are sealed at one of the end portions of each of the porous ceramic members.

3. The ceramic structure of claim 2, wherein the through holes are sealed such that the end portions on one side of the plurality of porous ceramic members are alternately sealed.

4. The ceramic structure of claim 1, wherein each of the porous ceramic members comprises a ceramic foam.

5. The ceramic structure of claim 1, wherein each of the porous ceramic members has an amount of warping which ranges from about 0.02 mm to about 2.0 mm.

6. The ceramic structure of claim 1, wherein each of the porous ceramic members has an amount of warping which ranges from about 0.1 mm to about 0.8 mm.

7. The ceramic structure of claim 1, wherein each of the porous ceramic members has an amount of warping which ranges from about 0.006% to about 1.0% of a length of the ceramic structure.

8. The ceramic structure of claim 1, wherein:
the end portions of the porous ceramic members form unfilled portions which are not filled with the adhesive; and
each of the unfilled portions has a length of from about 1% to about 10% of a length of the ceramic structure in the longitudinal direction.

9. The ceramic structure of claim 1 wherein:
the end portions of the porous ceramic members form unfilled portions which are not filled with the adhesive; and
each of the unfilled portions has a length of from about 2% to about 5% of the length of the ceramic structure in the longitudinal direction.

10. A method of manufacturing a ceramic structure, comprising:
providing a ceramic member assembly comprising a plurality of porous ceramic members and having spaces for supplying a bonding material between the porous ceramic members;
supplying the bonding material into the spaces formed in the ceramic member assembly; and
hardening the bonding material to bond the porous ceramic members to each other.

11. The method of claim 10, wherein:
each of the porous ceramic members is warped in a direction substantially perpendicular to a longitudinal direction of the ceramic member assembly and has end portions and a bonding portion between the end portions; and
the supplying comprises supplying the bonding material to the spaces corresponding only to the bonding portion.

12. A method of manufacturing a ceramic structure, comprising:
providing a device including an assembly unit configured to accommodate a plurality of porous ceramic members, and a supply unit connected to the assembly unit and configured to supply a bonding material;
assembling the plurality of porous ceramic members into a ceramic member assembly having spaces for supplying the bonding material formed in the ceramic member assembly;
supplying the bonding material from the supply unit to the spaces; and
hardening the bonding material to bond the porous ceramic members to each other.

13. The method of claim 12, wherein the assembling includes providing at least one spacer between the porous ceramic members.

14. The method of claim 12, wherein the assembling comprises assembling the plurality of porous ceramic members into the ceramic member assembly inside the assembly unit.

15. The method of claim 12, wherein the assembling comprises assembling the plurality of porous ceramic members into the ceramic member assembly outside the assembly unit and placing the ceramic member assembly in the assembly unit.

16. The method of claim 12, wherein:
each of the porous ceramic members is warped in a direction substantially perpendicular to a longitudinal direction of the ceramic member assembly and has end portions and a bonding portion between the end portions; and
the supplying comprises supplying the bonding material to the spaces corresponding only to the bonding portion.

17. The method of claim 16, wherein the supplying of the bonding material includes adjusting an amount of the bonding material such that the bonding material is supplied to the spaces corresponding only to the bonding portion.

18. The method of claim 13, wherein the assembling comprises assembling the plurality of porous ceramic members into the ceramic member assembly inside the assembly unit.

19. The method of claim 13, wherein the assembling comprises assembling the plurality of porous ceramic members into the ceramic member assembly outside the assembly unit and placing the ceramic member assembly in the assembly unit.

20. The method of claim 12, further comprising fabricating the plurality of porous ceramic members from a compositing including a ceramic powder and a binder.

21. The method of claim 10, further comprising fabricating the plurality of porous ceramic members from a compositing including a ceramic powder and a binder.

22. The method of claim 10, wherein the providing comprises providing a device including a cylindrical assembly unit configured to accommodate the ceramic member assembly, and a supply unit connected to the cylindrical assembly unit and configured to supply the bonding material to the spaces formed in the ceramic member assembly accommodated in the cylindrical assembly unit.

23. The method of claim 22, wherein the device has at least one supply hole communicating the supply unit and the cylindrical assembly unit for supplying the bonding material.

24. The method of claim 23, wherein the supply hole of the device has a groove shape.

25. The method of claim 23, wherein the cylindrical assembly unit has a plurality of end plates positioned to abut the end portions of the porous ceramic members and the plurality of end plates comprises a material having gas permeability.

26. The method of claim 23, wherein the cylindrical assembly unit has a plurality of end plates positioned to abut the end portions of the porous ceramic members and the plurality of end plates comprises an air tight material having a plurality of air holes.

27. A ceramic structure produced by the method of claim 10.

28. The ceramic structure of claim 27, wherein each of the porous ceramic members being warped in a direction substantially perpendicular to the longitudinal direction and having end portions and a bonding portion between the end portions, the bonding portion being provided with the adhesive connecting the porous ceramic members.

29. A device for manufacturing a ceramic structure, comprising:
- a cylindrical assembly unit configured to accommodate a ceramic member assembly, the ceramic member assembly comprising a plurality of porous ceramic members and having spaces for supplying a bonding material between the porous ceramic members; and
- a supply unit connected to the cylindrical assembly unit and configured to supply the bonding material to the spaces formed in the ceramic member assembly accommodated in the cylindrical assembly unit.

30. The device of claim 29, wherein the cylindrical assembly unit has at least one supply hole configured to supply the bonding material from the supply unit to the spaces in the ceramic member assembly in the cylindrical assembly unit.

31. The device of claim 30, wherein the supply hole of the cylindrical assembly unit has a groove shape.

32. The device of claim 29, wherein the cylindrical assembly unit has a plurality of end plates positioned to abut end portions of the porous ceramic members and the plurality of end plates comprises a material having gas permeability.

33. The device of claim 29, wherein the cylindrical assembly unit has a plurality of end plates positioned to abut end portions of the porous ceramic members and the plurality of end plates comprises an air tight material having a plurality of air holes.

* * * * *